US012355389B2

(12) United States Patent
Myers

(10) Patent No.: US 12,355,389 B2
(45) Date of Patent: Jul. 8, 2025

(54) INJECTION PUMP BATTERY SUPPORT BRACKET AND METHOD OF USE

(71) Applicant: TWM, LLC, Poolville, TX (US)

(72) Inventor: Taylor Myers, Poolville, TX (US)

(73) Assignee: TWM, LLC, Poolville, TX (US)

( * ) Notice: Subject to any disclaimer, the term of this patent is extended or adjusted under 35 U.S.C. 154(b) by 0 days.

(21) Appl. No.: 18/349,701

(22) Filed: Jul. 10, 2023

(65) Prior Publication Data
US 2025/0023504 A1 Jan. 16, 2025

(51) Int. Cl.
H02S 20/20 (2014.01)
H02S 40/38 (2014.01)

(52) U.S. Cl.
CPC .............. *H02S 20/20* (2014.12); *H02S 40/38* (2014.12)

(58) Field of Classification Search
CPC ... B65D 90/12; B65D 90/24; Y10T 137/0329; Y10T 137/85978; F16N 31/006; G05D 11/13; G05D 11/131; G05D 11/132; G05D 7/0676; H02S 20/20; H02S 20/30; H02S 30/10; H02S 40/38
See application file for complete search history.

(56) References Cited

U.S. PATENT DOCUMENTS

| | | | |
|---|---|---|---|
| 4,744,334 A | 5/1988 | Mcanally | |
| 5,205,446 A | 4/1993 | Greenberg | |
| 5,293,892 A | 3/1994 | Fourqurean | |
| 5,599,470 A | 2/1997 | Peotter et al. | |
| 5,692,647 A | 12/1997 | Brodie | |
| 6,484,984 B2 | 11/2002 | Hawes | |
| 6,581,897 B2 | 6/2003 | Ruschke | |
| D632,231 S | 2/2011 | Mattucci | |
| 8,295,033 B2 | 10/2012 | Van Straten | |
| 9,051,118 B2 * | 6/2015 | Jacobson | B65D 90/24 |
| 9,285,071 B1 | 3/2016 | Rowland | |
| 10,336,601 B2 | 7/2019 | Wiebe | |
| 11,417,930 B2 | 8/2022 | Qin et al. | |
| 2001/0014840 A1 * | 8/2001 | Marshall | G05D 11/132 700/266 |

(Continued)

FOREIGN PATENT DOCUMENTS

| | | |
|---|---|---|
| CN | 106438265 A | 2/2017 |
| CN | 212871300 U | 4/2021 |

(Continued)

OTHER PUBLICATIONS

MCI Solutions, "Solar Pump Packages", https://web.archive.org/web/20160323044506/https://mcisolutions.ca/our-products/solar-pump-packages/ last accessed Feb. 16, 2023.

(Continued)

Primary Examiner — Mayla Gonzalez Ramos
(74) Attorney, Agent, or Firm — Schultz & Associates, P.C.

(57) ABSTRACT

A brace is provided with a removably secures a battery box and a set of solar panels to a bulk chemical storage tank so that the tank, the battery box and the solar panels may be moved as an integral unit. In one embodiment, the brace employs a novel cantilever arrangement. In another embodiment, the brace employs an offset catch to counteract a moment created by the battery weight. In another embodiment, the brace is part of a system which employs a tank stabilizing riser bracket.

14 Claims, 22 Drawing Sheets

(56) References Cited

U.S. PATENT DOCUMENTS

| | | | |
|---|---|---|---|
| 2007/0048152 A1* | 3/2007 | Conally | F04B 35/04 |
| | | | 417/411 |
| 2019/0072085 A1 | 3/2019 | Schultz | |
| 2021/0108396 A1* | 4/2021 | Bromley | H01M 10/425 |
| 2022/0349519 A1 | 11/2022 | Vallo et al. | |

FOREIGN PATENT DOCUMENTS

| | | |
|---|---|---|
| CN | 107946509 B | 6/2021 |
| CN | 217235211 U | 8/2022 |
| CN | 217382419 U | 9/2022 |
| CN | 115230451 A | 10/2022 |
| CN | 217944906 U | 12/2022 |
| DE | 212020000073 U1 | 8/2020 |
| WO | 2022027739 A1 | 2/2022 |

OTHER PUBLICATIONS

Champion X, "Multipoint chemical injection systems", https://www.championx.com/products-and-solutions/digital-control-automation-and-optimization/wellmark-chemical-injection-pumps/complete-chemical-injection-skid/ last accessed Feb. 16, 2023.

Sidewinder Pumps, "Solar Pump Package Systems", https://www.sidewinderpumps.com/product/solar-pump-package-systems/ last accessed Feb. 18, 2023.

\* cited by examiner

INJECTION PUMP BATTERY SUPPORT BRACKET AND METHOD OF USE

FIELD OF THE INVENTION

The present invention relates generally to mounting brackets and mounting hardware for oil field chemical injection systems.

BACKGROUND OF THE INVENTION

Chemicals of various types are used in every stage of drilling, completion, and production of oil and gas wells. These chemicals include common inorganic salts, transition metal compounds, common organic chemicals and solvents, water-soluble and oil-soluble polymers, and surfactants. As existing fields become depleted, use of chemistry to maintain production by well stimulation, more efficient secondary recovery operations, and enhanced oil recovery become ever more important.

Chemical injection pumps are used to deliver the specialty chemicals required into the production system at specified rates. The pumps must be reliable and accurately positioned in order to get the chemicals into the production system in order to accomplish a treatment program. Most treatment programs require a predetermined concentration or dosage of the chemical be added to the system on a continuous basis. This requirement calls for equipment that is capable of metering a precise volume of chemical into a system at a rate that will maintain the proper chemical to fluid ratio.

There are many types of chemical injection pumps used in the oil field. Some are mechanically operated. Others are driven by compressed field gas, air, or electricity.

Typically, electric pumps are used where there is a low danger of contact with explosive vapors. These pumps can be equipped with a self-contained reservoir for storing treating chemicals such as a bulk storage tank.

Bulk storage tanks provide a simple and efficient method to supply necessary chemicals to the injection pump. Bulk storage tanks also see heavy use to store lubricants and chemical solutions, which are used to improve oil recovery, remove formation damage, clean blocked perforations or form formation layers, reduce or inhibit corrosion, upgrade crude oil, and address crude oil flow assurance issues.

Despite their advantages, chemical injection systems and tanks can and do appear to malfunction for no apparent reason. Common problems include plugged strainers, air-locked pump cylinders, and lack of proper power. Another typical problem is that the pump is positioned too far from the treating vessel. In this case, an emulsion is often created as the injection chemical encounters turbulent flow in the delivery lines. Likewise, having the pump located too close to the treating vessel creates problems because the injection chemical may not have adequate mixing time before entering the treating vessel.

To correct positioning problems, injection pumps and bulk storage tanks are usually moved farther away from or closer to the treating vessel. Typically, a forklift is used to move the tank without draining it. But, in the prior art, the pump and its controller must be moved separately from the bulk storage tank in a two-step process.

Referring to FIG. 1, most chemical injection systems include storage tank 102 which is used to store the necessary chemicals. Tank 102 is generally cylindrical also includes supports such as rear support 124 and front support 126, fixed to bottom surface 128, which stabilize the tank. The tank is usually positioned in a catch basin, such as catch basin 104. The catch basin is used to prevent chemical runoff and leaks from entering the environment. Catch basin 104 typically includes vertical wall 122, exterior surface 130, interior surface 132, and top surface 134 which together prevent leakage from escaping. Fork entry 175 and fork entry 176 are provided in the basin beneath the supports to allow the tank to be lifted and moved by a skyjack forklift.

Tank 102 is connected to injection pump 116 via hose 120. Injection pump 116 further includes hose 118 connected to the treatment vessel (not shown). Injection pump 116 is connected to a series of batteries and a controller, sealed in battery box 106, by power cables 114. The controller and batteries are further connected to solar panel 110 by power cables 112. Solar panel 110 is usually supported by a series of brackets (not shown) mounted to pole 108.

Typically, the base of the pole is driven into the ground beside the catch basin. However, securing the pole in the ground is not ideal because when the tank must be repositioned, the batteries and solar panels must be disconnected and moved separately from the tank, only to be reconnected later. Separately moving the solar panels and batteries is inefficient and creates unnecessary delay when adjusting the distance of the chemical injection system from the injection point.

The prior art has addressed various mounting problems in the past in different unrelated fields, but none is satisfactory to cure the problems presented by the unattached pump and controller in an oil field chemical injection system.

One example can be found in U.S. Publication No. 2022/0349519 to Vallo. Vallo discloses a support system for a storage container, such as a suitcase, which includes a bracket removably positioned in a supporting wall. However, the fulcrum of the device is not adequately supported to carry any substantial load, and it does not include a means to prevent slippage of the bracket.

Another example is U.S. Pat. No. 9,285,071 to Rowland. Rowland discloses a bracket for supporting an air conditioning condenser above grade. A beam supports an air handler in a cantilevered fashion. However, Rowland does not disclose a containment lip of a catch basin as a fulcrum point for the supporting bracket.

U.S. Publication No. 2019/0072085 to Schultz discloses a battery box support for solar powered fluid pump for concrete release agents. The support includes a base on which a container of fluid is carried. The base includes support members connecting flat, upper and lower panels. The base is supported by a framework. The framework supports the solar panel, electric pump, and a battery box. However, neither the base nor the framework form a fulcrum, nor is the battery cantilevered on the support panels.

Injection pump systems of the prior art can be vastly improved by removably securing the batteries, the controller and solar panels to the storage tank to facilitate moving and setup of the system. Thus, there is a need in the art for an improved system for supporting components of chemical injection systems that allows for efficient mobility of the chemical injection system components.

SUMMARY OF THE INVENTION

A brace is provided in which a proximate end is positioned between the chemical tank and the catch basin, and a distal end extends outward to support the battery box and timing controller.

In one preferred embodiment, two longitudinal beams and one transverse beam form an "H" shaped brace. The longitudinal beams are positioned beneath opposing sides of a cylindrical storage tank and in contact with a top edge of the catch basin. The transverse beam is positioned adjacent to and in contact with an interior surface of the catch basin adjacent the top edge. The brace further includes a bracket that secures a solar panel mounting post. Importantly, the longitudinal beams are positioned to offset the moment created battery box, thereby supporting the battery box in a novel cantilevered fashion, which securely and yet removably mounts the brace, the batteries, the controller and the solar panels to the storage tank and basin. In this way, all components of the bulk storage tank are secured to a single movable frame which may be moved as an integral unit.

Various other preferred embodiments provide a variety of different configurations for the brace. In most configurations, the battery box is cantilevered about a fulcrum which counteracts the moment created by positioning the battery box at one end of the brace.

Mounting the braces to the catch basin in a cantilevered fashion is an improvement over the prior art because it allows for efficient installation and removal of the brace and provides an efficient means for the storage tank, basin, batteries, controller and solar panels to be fixed together in a secure fashion and so moved as a single integrated unit.

BRIEF DESCRIPTION OF THE DRAWINGS

In the detailed description of the preferred embodiments presented below, reference is made to the accompanying drawings.

DETAILED DESCRIPTION OF THE INVENTION

In the description that follows, like parts are marked throughout the specification and figures with the same numerals. The figures are not necessarily drawn to scale and may be shown in an exaggerated or generalized form for the purposes of clarity and conciseness. Unless otherwise specified, use of the terms "about", "generally" or "approximately" indicate a tolerance of ±20%.

Figure 1:
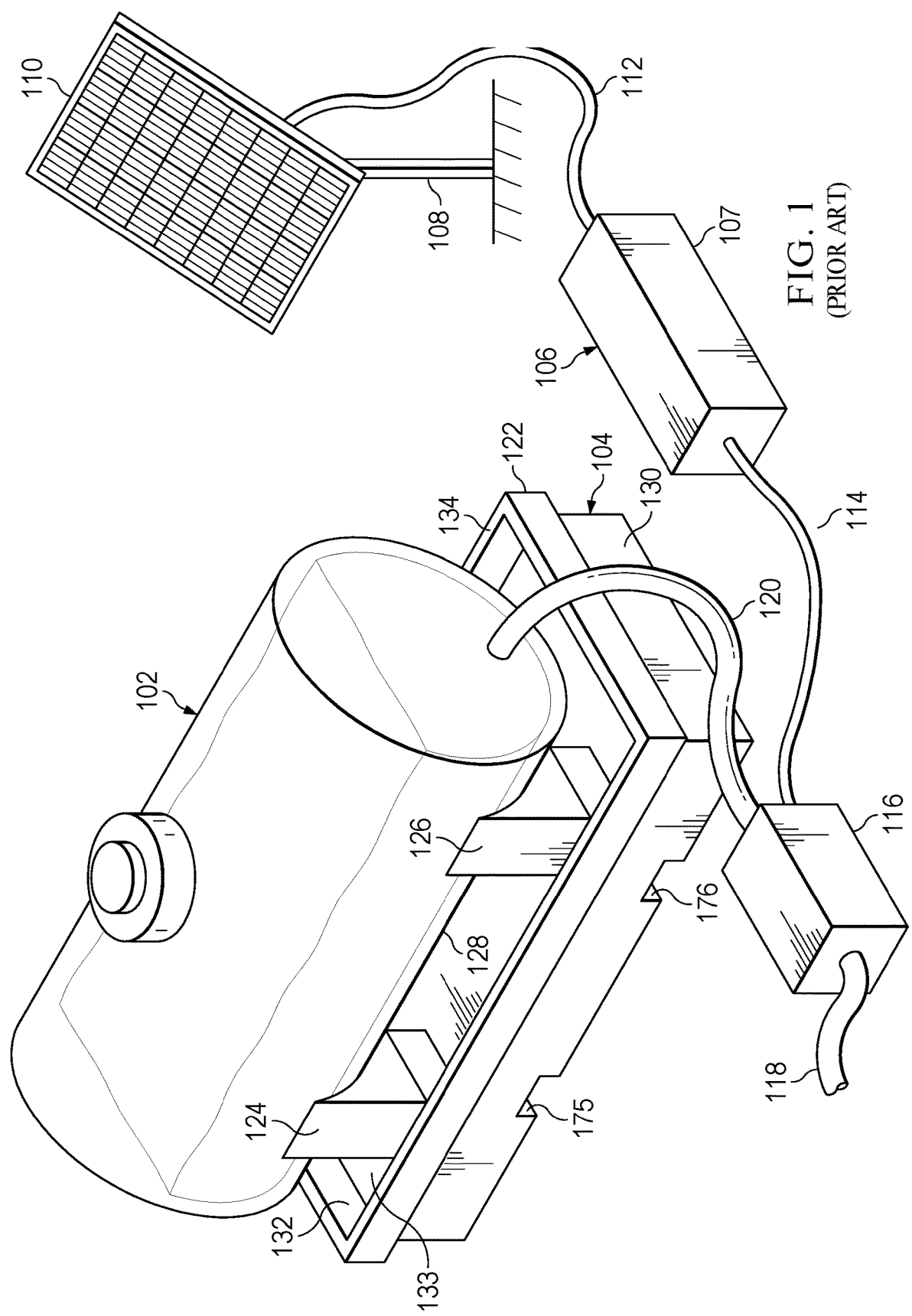
FIG. 1 is an isometric view of a injection pump and storage tank system of the prior art.
Figure 2:
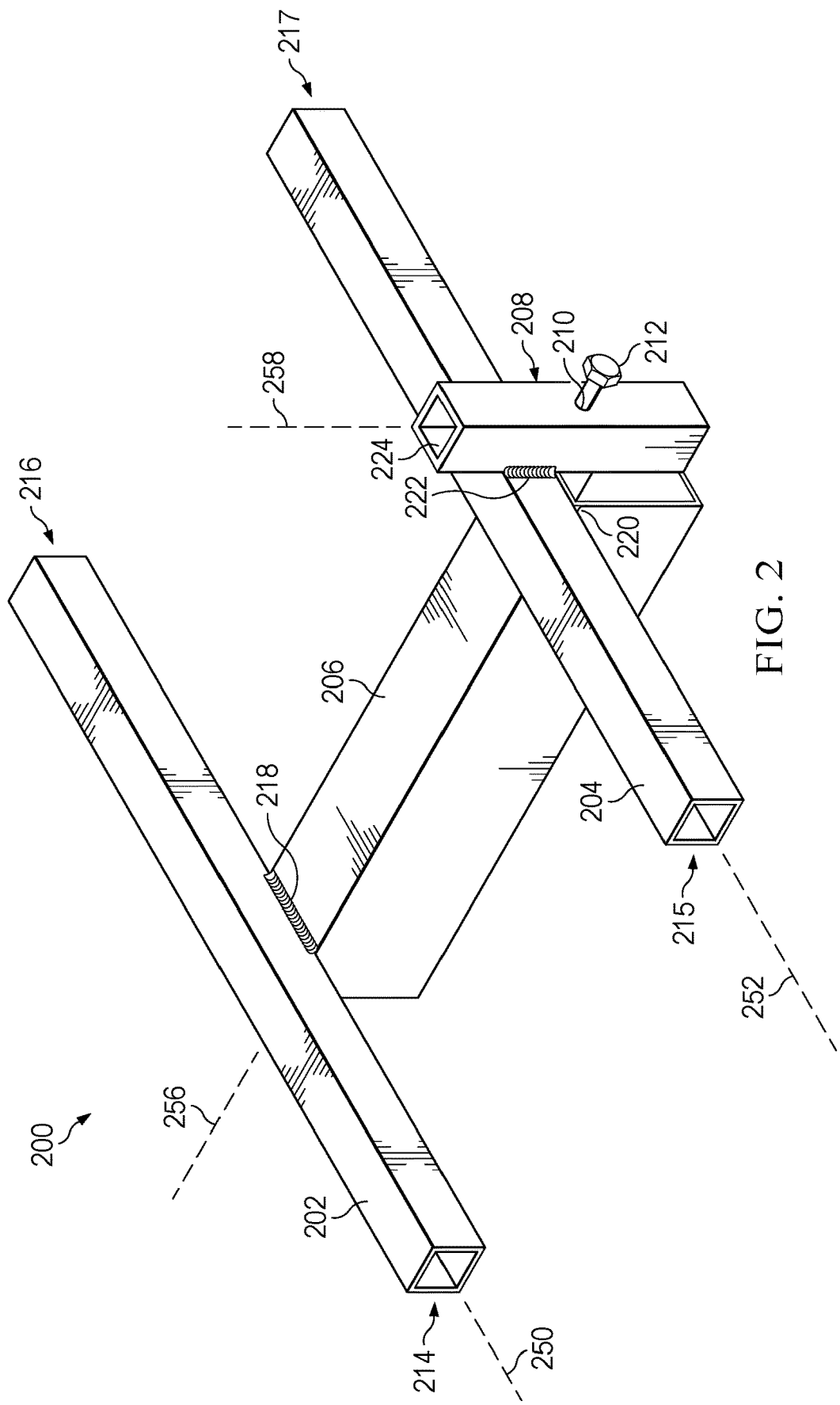
FIG. 2 is an isometric view of a preferred embodiment of a brace.

Referring to FIG. 2, H-brace 200 will be further described.

H-brace 200 is comprised of longitudinal beam 202, longitudinal beam 204, transverse beam 206 and vertical bracket 208.

Longitudinal beam 202 comprises proximal end 214 and distal end 216 centered on longitudinal axis 250. Longitudinal beam 202 is connected to transverse beam 206, centered on transverse axis 256, at its approximate midpoint, by weldment 218. Longitudinal beam 204 includes proximal end 215 and distal end 217 along longitudinal axis 252. Longitudinal beam 204 is connected to transverse beam 206, at its approximate midpoint, by weldment 220. In another preferred embodiment, the brace may employ bolted connections.

Longitudinal beam 204 is rigidly attached to vertical bracket 208. The vertical bracket is positioned at about the midpoint between proximal end 215 and distal end 217 and preferably extends about 2 inches above the top surface of the longitudinal beams and is flush with the bottom surface of the transverse beam. In another embodiment, the vertical bracket may be mounted to longitudinal beam 202, adjacent the transverse beam. Vertical bracket 208 comprises hole 224 and threaded hole 210, preferably on an exterior surface. Bolt 212 is threaded into threaded hole 210. In a preferred embodiment, vertical bracket 208 is welded to longitudinal beam 204 at weldment 222 in a vertical orientation and having a vertical axis 258. In another embodiment, vertical bracket 208 is bolted to longitudinal beam 204.

Transverse axis 256 is oriented generally perpendicular to longitudinal axis 250 and longitudinal axis 252. Longitudinal axes 250 and 252 are preferably coplanar and generally parallel. Vertical axis 258 is preferably generally perpendicular to longitudinal axes 250 and 252 and transverse axis 256.

In a preferred embodiment, longitudinal beams 202 and 204 are each about 3 feet long and are formed from 2-inch square channel stock. Preferably, transverse beam 206 is approximately 16 inches long and is formed from 4-inch square channel stock. Likewise, vertical bracket 208 is preferably 4-inch square channel stock. Preferably, the longitudinal beams, transverse beam, and bracket are formed of A572, A588, or A36 steel channel. Alternatively, the longitudinal beams and transverse beam can be formed of A572, A588, or A36 steel angle stock.

In use, proximal end 214 and proximal end 215 of the longitudinal beams are positioned under the tank adjacent bottom surface 128. Both longitudinal beams are balanced on top surface 134. Transverse beam 206 is positioned adjacent vertical wall 122 and contacts interior surface 132.

Vertical bracket 208 is positioned adjacent to vertical wall 122 and contacts interior surface 132. The battery box is secured to distal end 216 and distal end 217. The pole is secured in hole 224 of vertical bracket 208.

Figure 3:
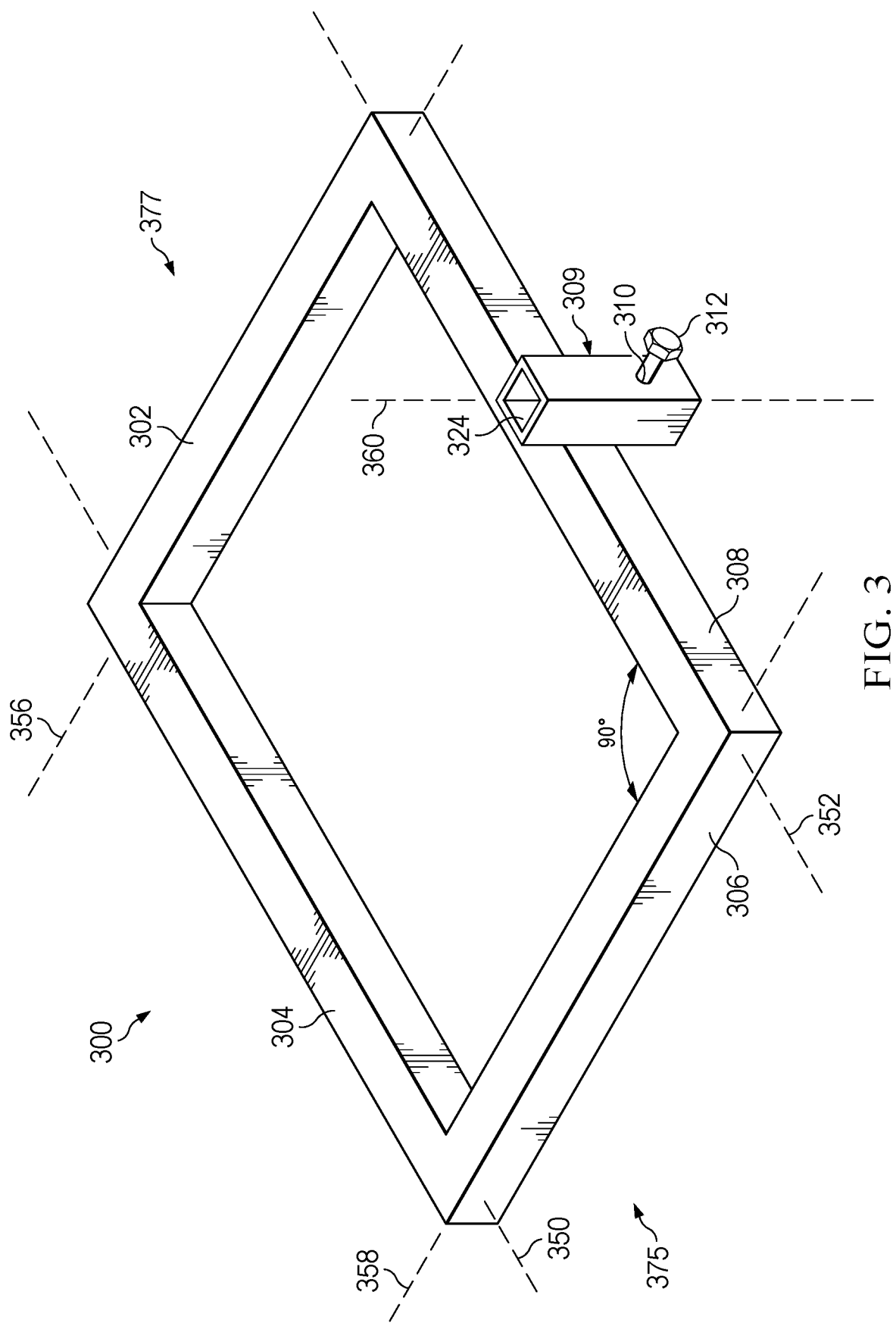
FIG. 3 is an isometric view of a preferred embodiment of a brace.

Referring to FIG. 3, box brace 300 will be further described.

Box brace 300 is comprised of transverse beam 302, transverse beam 306, longitudinal beam 304, longitudinal beam 308 and vertical bracket 309. The brace has proximal end 375 and distal end 377.

Transverse beam 302 is centered on transverse axis 356. Longitudinal beam 304 is centered on longitudinal axis 350. Transverse beam 306 is centered on transverse axis 358. Longitudinal beam 308 comprises longitudinal axis 352. The vertical bracket is centered on vertical axis 360.

Transverse beam 302 is connected to longitudinal beams 304 and 308. Likewise, transverse beam 306 is connected to longitudinal beams 304 and 308. In a preferred embodiment, the beams are connected by weldments. In another preferred embodiment, the beams are connected by bolts.

Longitudinal beam 308 is rigidly attached to vertical bracket 309. The vertical bracket is positioned about halfway between the proximal end and the distal end. The vertical bracket extends below the bottom surface of longitudinal beam 308 by about 4 inches and preferably extends vertically above the top surface of the longitudinal beam by about 2 inches. In another embodiment, the bracket may be mounted to longitudinal beam 304, in a central position. Vertical bracket 309 includes hole 324 centered on the vertical axis and threaded hole 310, preferably on an exterior surface. Bolt 312 is threaded into threaded hole 310. In a preferred embodiment, vertical bracket 309 is welded to longitudinal beam 308. In another embodiment, vertical bracket 309 is bolted to longitudinal beam 308.

Transverse axes 356 and 358 are generally perpendicular to longitudinal axes 350 and 352. Longitudinal axes 350 and 352 are preferably generally parallel. Likewise, transverse axes 356 and 358 are preferably generally parallel. Each of the longitudinal axes and transverse axes are preferably co-planar. Vertical axis 360 is preferably generally perpendicular to each of longitudinal axes 350 and 352 and transverse axes 356 and 358.

In use, transverse beam 306 at proximal end 375 is positioned under the storage tank. Longitudinal beams 304 and 308 are positioned adjacent bottom surface 128. Both longitudinal beams are balanced in contact with top surface 134 of vertical wall 122. Vertical bracket 309 is positioned adjacent vertical wall 122 and contacts interior surface 132. The battery box is secured to transverse beam 302 at distal end 377. The pole is secured in hole 324 of vertical bracket 309.

In a preferred embodiment, longitudinal beams 304 and 308, transverse beams 302 and 306, are formed of 2-inch square channel stock. Similarly, vertical bracket 408 is preferably 4-inch square channel stock. Preferably, the longitudinal beams, transverse beams, and vertical bracket are formed of A572, A588, or A36 steel channel. Steel angle stock may also be employed and has the advantage of reduced weight.

Figure 4:
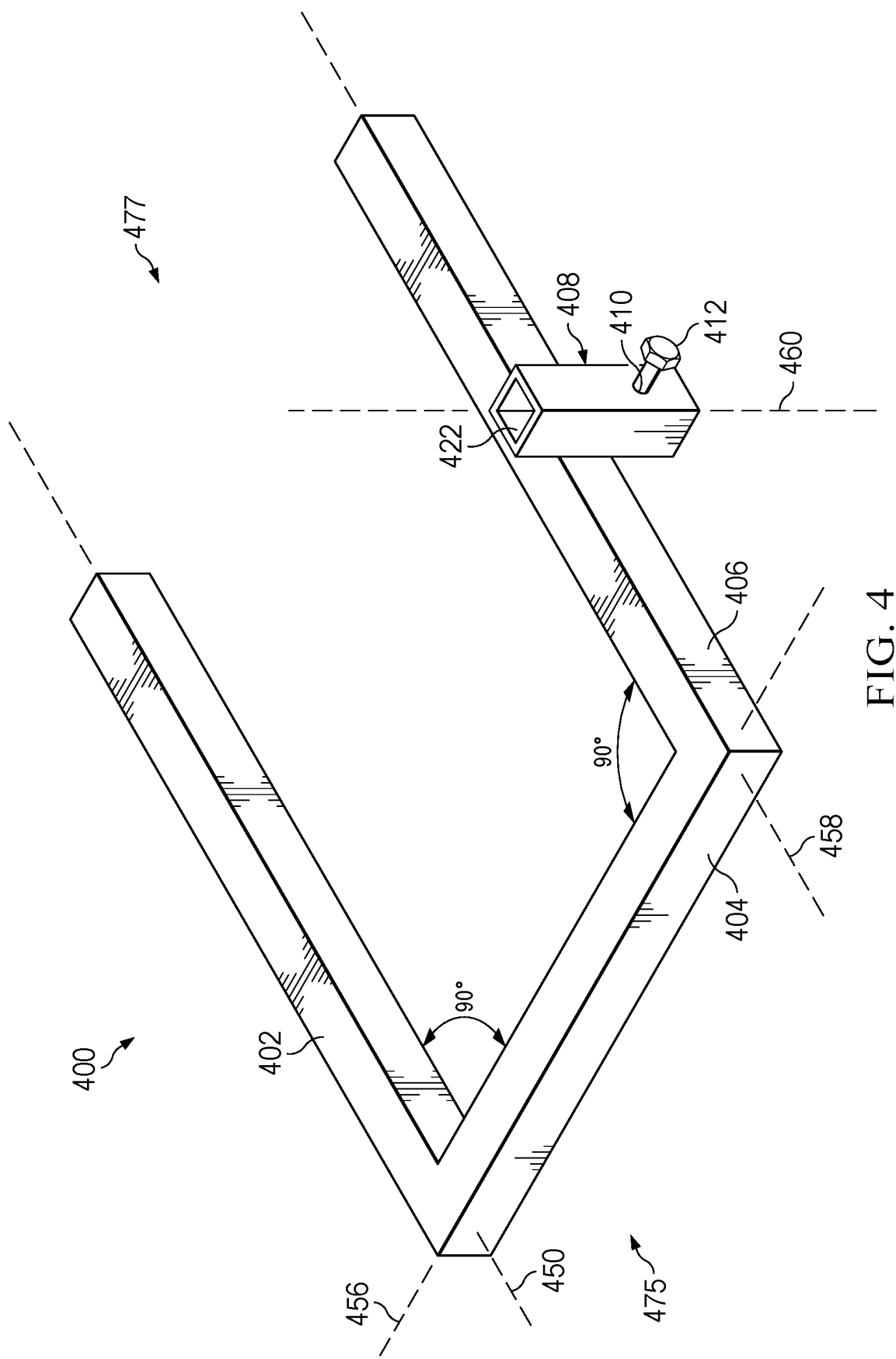
FIG. 4 is an isometric view of a preferred embodiment of a brace.

Referring to FIG. 4, "U-brace" 400 will be further described. The U-brace has proximal end 475 and distal end 477.

U-brace 400 is comprised of longitudinal beam 402, longitudinal beam 406, transverse beam 404, and vertical bracket 408.

Longitudinal beam 402 is centered on longitudinal axis 450. Transverse beam 404 is centered on transverse axis 456. Longitudinal beam 406 is centered on longitudinal axis 458. Vertical bracket 408 is centered on vertical axis 460.

Longitudinal beam 402 is connected to transverse beam 404. Transverse beam 404 is connected to longitudinal beam 406. In a preferred embodiment, the beams are welded together. In another preferred embodiment, the brace may employ bolted connections.

Longitudinal beam 406 is further connected to vertical bracket 408 along its exterior surface. The vertical bracket is positioned at about the midpoint between the proximal end and the distal end, and preferably extends above the longitudinal beam by about 2 inches and below the longitudinal beam by about 4 inches. In another embodiment, the vertical bracket may be fixed to longitudinal beam 402 in an exterior central position. Vertical bracket 408 comprises hole 422 and threaded hole 410, preferably on an exterior surface. Bolt 412 is threaded into threaded hole 410. In a preferred embodiment, vertical bracket 408 is welded to longitudinal beam 406. In another embodiment, vertical bracket 408 is bolted to longitudinal beam 406. In a preferred embodiment, the beams are welded together. In another preferred embodiment, the brace may employ bolted connections.

Transverse axis 456 is oriented generally perpendicular to longitudinal axis 450 and longitudinal axis 458. Longitudinal axes 450 and 458 are preferably generally parallel. The longitudinal axes and the transverse axis are preferably co-planar. Vertical axis 460 is preferably generally perpendicular to transverse axis 456 and longitudinal axes 450 and 458.

In use, transverse beam 404 at proximal end 475 is positioned under the storage tank. Longitudinal beams 402 and 406 are positioned adjacent vertical wall 122 and are balanced on top surface 134. Vertical bracket 408 is positioned adjacent to vertical wall 122 and contacts interior surface 132. The battery box is secured to distal end 477 end of longitudinal beams 402 and 406. The pole is secured in hole 422 of vertical bracket 408.

Preferably, the longitudinal beams and the transverse beam are 2-inch square channel stock formed from A572, A588, A36 steel. Steel angle may also be employed for weight reduction. Vertical bracket 408 is preferably formed from 4-inch steel channel.

Figure 5A:
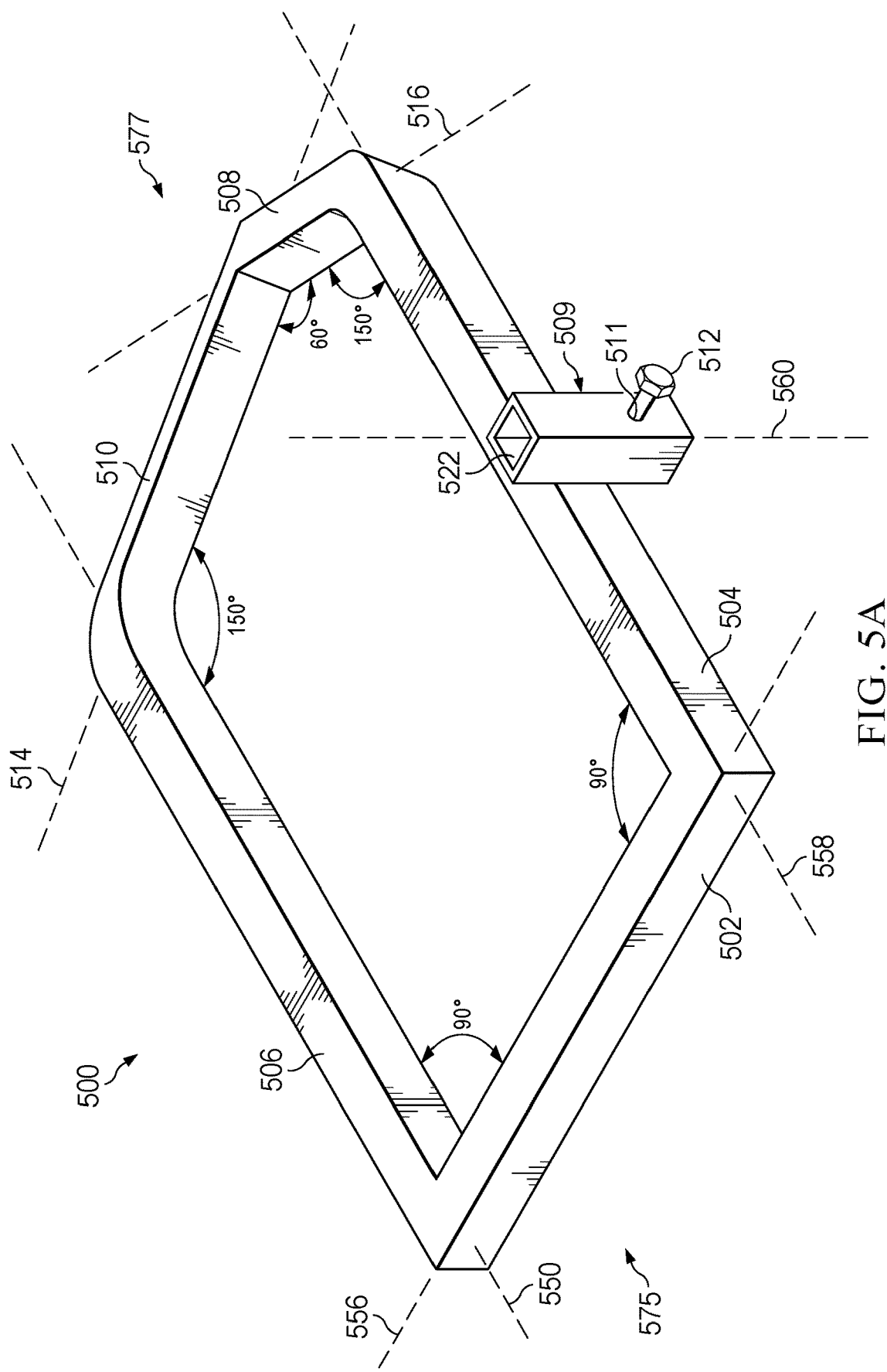
FIG. 5A is an isometric view of a preferred embodiment of a brace.
Figure 5B:
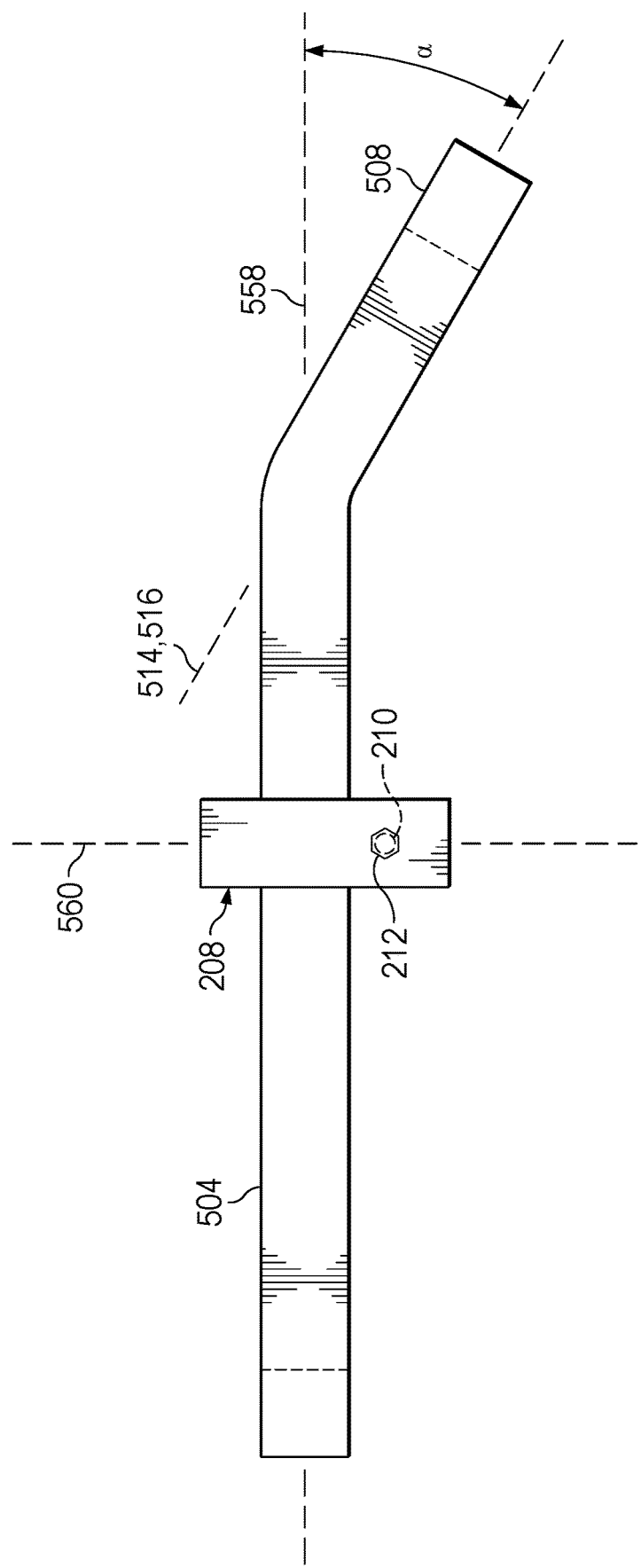
FIG. 5B is an elevation view of a preferred embodiment of a brace.

Referring to FIGS. 5A and 5B, apex brace 500 will be further described. Apex brace 500 has proximal end 575 and distal end 577.

Apex brace 500 is comprised of transverse beam 502, longitudinal beams 504 and 506, diagonal beams 508 and 510, and vertical bracket 509.

Transverse beam 502 is centered on transverse axis 556. Longitudinal beams 504 and 506 is centered on longitudinal axes 558 and 550, respectively. Diagonal beams 508 and 510 are centered on diagonal axes 516 and 514, respectively, as will be further described.

Transverse beam 502 is connected to longitudinal beams 504 and 506. Longitudinal beam 506 is further connected to diagonal beam 510. Diagonal beam 510 is further connected to diagonal beam 508. Diagonal beam 508 is further connected to longitudinal beam 504. In a preferred embodiment, the beams are welded together. In another preferred embodiment, the brace may employ bolted connections.

Transverse axis 556 is oriented generally perpendicular to and coplanar with longitudinal axes 550 and 558. Longitudinal axes 550 and 558 are preferably generally parallel. Diagonal axis 514 intersects longitudinal axis 550 at about a 150° angle. Diagonal axis 514 further intersects diagonal axis 516 at about a 60° angle. Diagonal axis 516 further intersects longitudinal axis 558 at about a 150° angle.

Diagonal axes 514 and 516 form a down angle α of between about 10° and about 30° with respect to longitudinal axes 550 and 558, respectively. The down angle is important because in some bulk storage tank configurations, the proximal end of the brace is positioned below the distal end, thereby cantilevering the brace at an upward angle. The compensating down angle allows placement of the battery box on a level surface when the brace is in use, as will be further described. Vertical axis 560 is preferably about perpendicular to transverse axis 556 and longitudinal axes 550 and 558.

Longitudinal beam 504 is rigidly attached to vertical bracket 509. The vertical bracket is positioned at about the midpoint between the proximal end and the distal end, and preferably extends about 2 inches above and about 4 inches below the longitudinal beam. In another embodiment, the vertical bracket may be similarly positioned on longitudinal beam 506. Vertical bracket 509 comprises hole 522 and threaded hole 511, preferably on an exterior surface. Bolt 512 is threaded into threaded hole 511. In a preferred embodiment, vertical bracket 509 is welded to longitudinal beam 504. In another embodiment, vertical bracket 509 is bolted to longitudinal beam 504.

In use, transverse beam 502 is positioned under the storage tank adjacent bottom surface 128. Longitudinal beams 504 and 506 are positioned adjacent vertical wall 122 and are balanced on top surface 134. Vertical bracket 509 extends above and is positioned adjacent to vertical wall 122 and contacts interior surface 132. The battery box is secured to the diagonal beams. The pole is secured in the bracket.

Figure 6A:
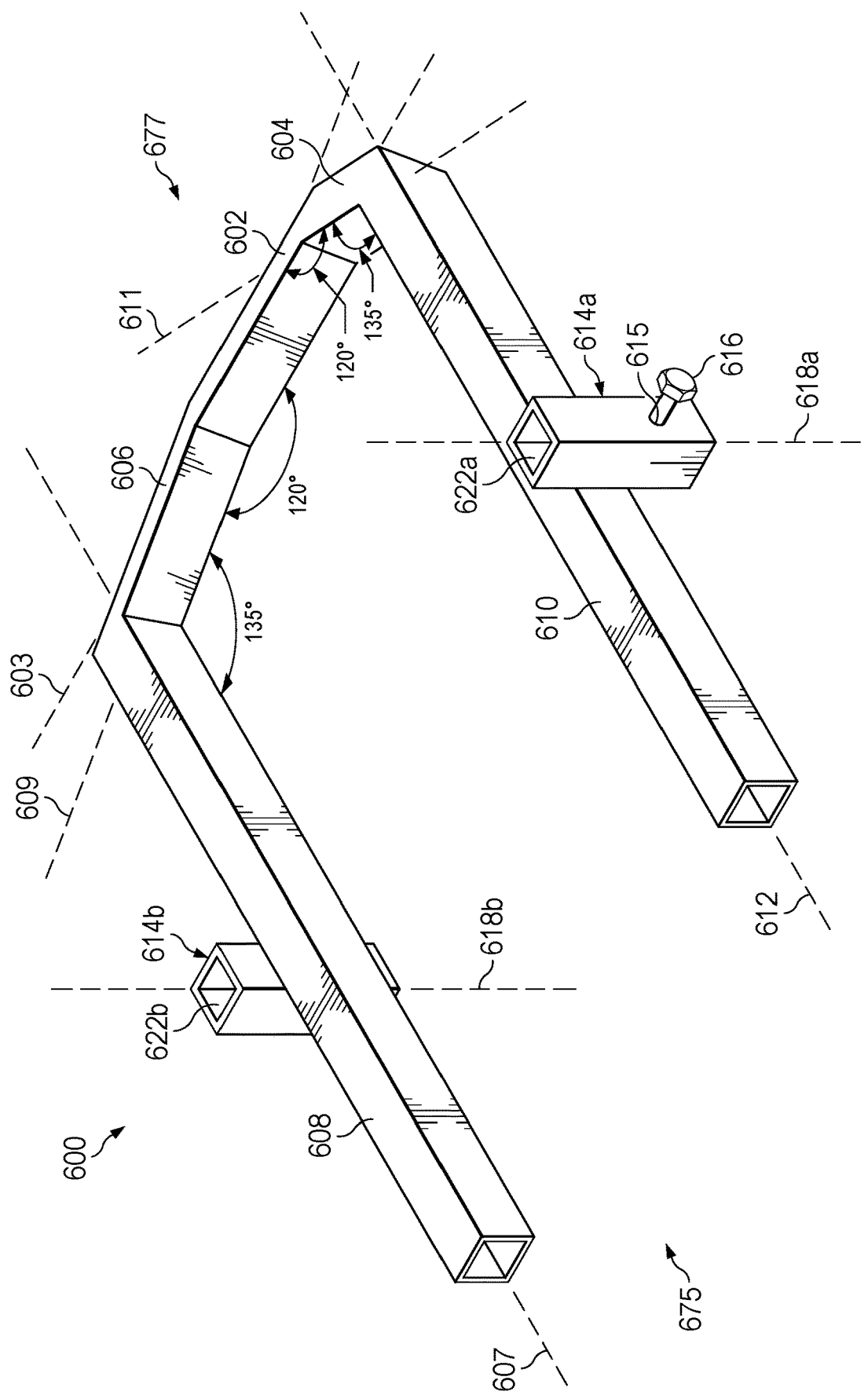
FIG. 6A is an isometric view of a preferred embodiment of a brace.
Figure 6B:
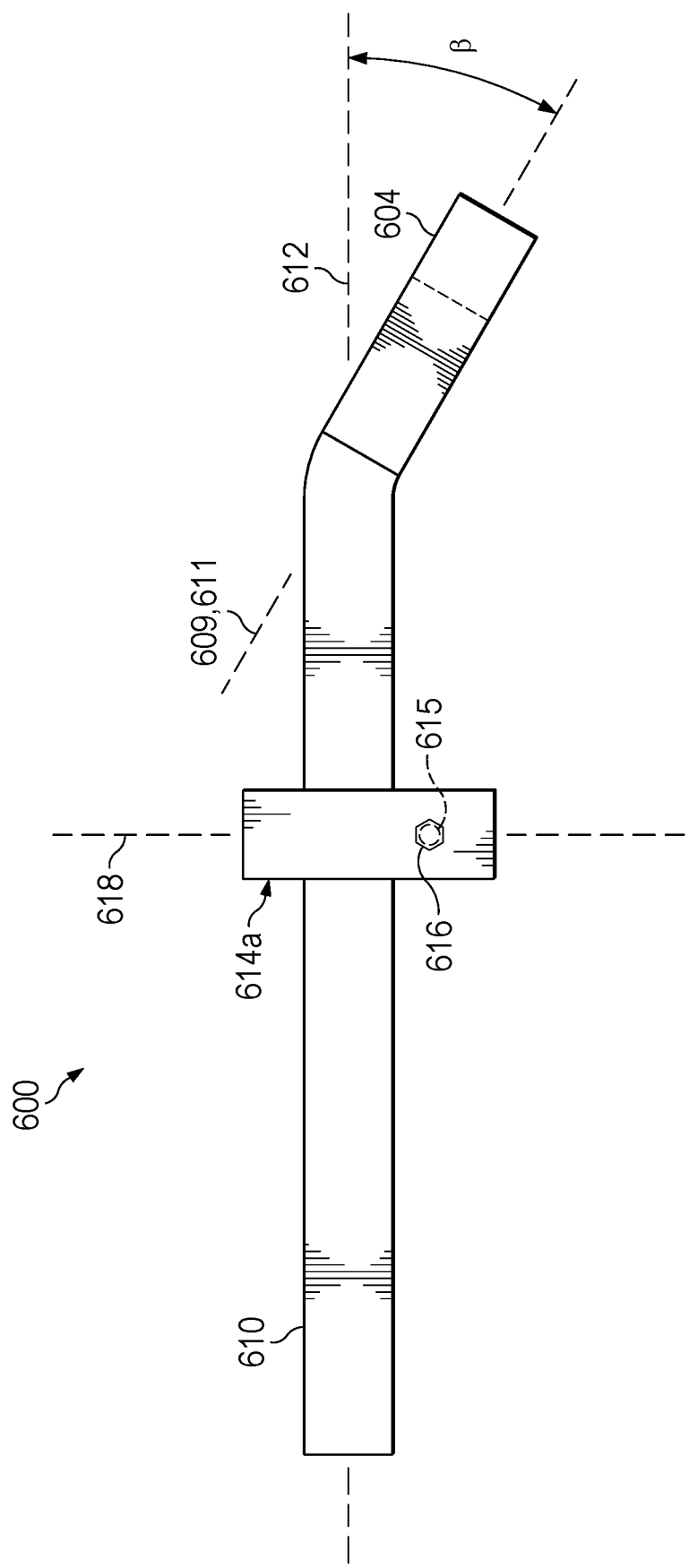
FIG. 6B is an elevation view of a preferred embodiment of a brace.

Referring to FIGS. 6A and 6B, "V-brace" 600 will be further described. The V-brace has proximal end 675 and distal end 677.

V-brace 600 is comprised of longitudinal beam 608 and longitudinal beam 610, diagonal beam 606 and diagonal beam 604, transverse beam 602, vertical bracket 614a and vertical bracket 614b.

Transverse beam 602 is centered on transverse axis 603. Longitudinal beams 608 and 610 are centered on longitudinal axis 607 and longitudinal axis 612, respectively. Diagonal beams 604 and 606 are centered on diagonal axis 611 and diagonal axis 609, respectively.

Longitudinal beam 608 is connected to diagonal beam 606. Diagonal beam 606 is further connected to transverse beam 602. Transverse beam 602 is further connected to diagonal beam 604. Diagonal beam 604 is further connected to longitudinal beam 610. In a preferred embodiment, the beams are welded together. In another preferred embodiment, the brace may employ bolted connections.

Transverse axis 603 is oriented generally perpendicular to longitudinal axes 607 and 612. Longitudinal axes 607 and 612 are preferably coplanar and generally parallel. Diagonal axis 609 intersects longitudinal axis 607 at about a 135° angle. Diagonal axis 609 further intersects transverse axis 603 at about a 120° angle. Transverse axis 603 further intersects diagonal axis 611 at about a 120° angle. Diagonal axis 611 further intersects longitudinal axis 612 forming at a 135° angle. Other angles may be employed with equal success. Diagonal axes 609 and 611 form a down angle "β" of between about 10° and about 30° with respect to longitudinal axes 607 and 612. This down angle is important because it allows diagonal beams 604 and 606 support the battery box in a level position when the brace is in use, for reasons previously described. Vertical axis 618 is generally perpendicular to transverse axis 603 and longitudinal axis 607.

Vertical bracket 614a is centrally positioned on longitudinal beam 610, preferably at the midpoint between the distal end and the proximal end. Vertical bracket 614b is similarly positioned on longitudinal beam 608. The vertical brackets preferably extend about 2 inches above and about 4 inches below the longitudinal beams. Vertical bracket 614a comprises vertical hole 622a, centered on vertical axis 618a, and threaded hole 615, preferably on an exterior surface. Vertical bracket 614b also includes a vertical hole 622b, centered on vertical axis 618b. Bolt 616 is threaded into threaded hole 615. In the same way, a threaded hole and bolt (not shown) are included in vertical bracket 614b. In a preferred embodiment, the vertical brackets are welded to the longitudinal beams. In another embodiment, the vertical brackets are bolted to the longitudinal beams.

Preferably, the longitudinal beams, the diagonal beams, and the transverse beam are all formed from 2-inch square channel stock and made of A572, A588, or A36 steel. Preferably, the vertical brackets are formed from 4-inch steel channel. Alternatively, the beam may be formed from angle stock to reduce weight. Likewise, the beams may include weight reducing holes, or be fabricated from aluminum or titanium to reduce weight.

In use, the longitudinal beams are positioned under the storage tank adjacent vertical wall 122 and balanced on top surface 134. The vertical brackets extend above and are positioned adjacent to vertical wall 122 and contact interior surface 132. The battery box is supported by the diagonal beams and the transverse beam. One or more poles supporting a solar panel is secured in at least one of the vertical brackets.

Figure 7:
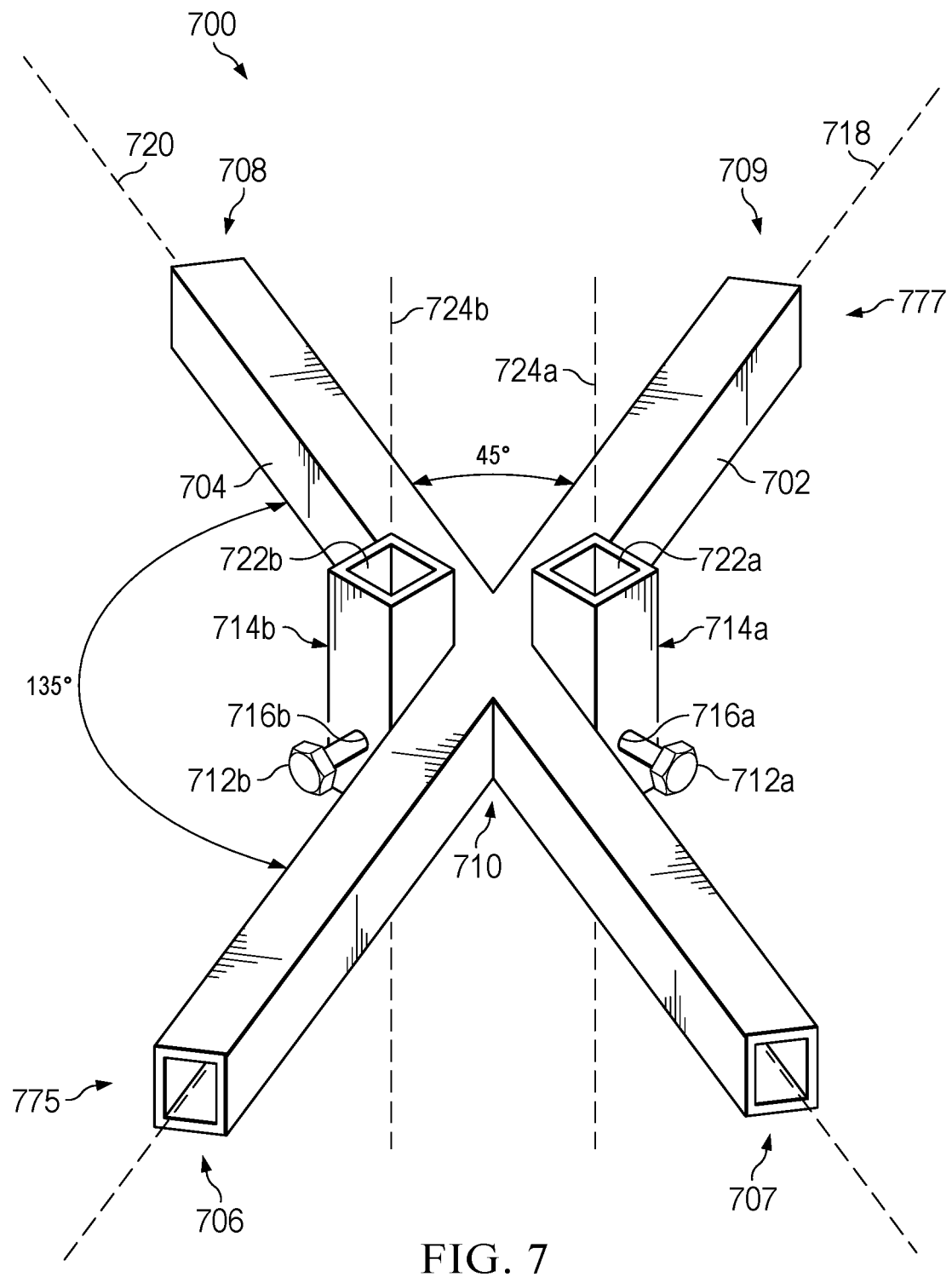
FIG. 7 is an isometric view of a preferred embodiment of a brace.

Referring to FIG. 7, "X-brace" 700 will be further described. The X-brace has proximal end 775 and distal end 777.

X-brace 700 comprises diagonal beam 702 and diagonal beam 704, and vertical brackets 714a and 714b.

Diagonal beam 702 comprises proximal end 706 and distal end 709 centered on diagonal axis 718. Diagonal beam 704 comprises proximal end 707 and distal end 708 centered on diagonal axis 720. Vertical bracket 714a is centered on vertical axis 724a. Vertical bracket 714b is centered on vertical axis 724b.

In a preferred embodiment, the beams are welded together. In another preferred embodiment, the brace may employ bolted connections.

Vertical axis 724a is oriented generally perpendicular to diagonal axis 718 and diagonal axis 720. Diagonal axes 718 and 720 are coplanar and intersect at complimentary angles of about 45° and about 135° at intersection 710. Other complimentary angles may be used.

Diagonal beam 702 is rigidly attached to vertical bracket 714a at intersection 710. Likewise, diagonal beam 704 is rigidly attached to vertical bracket 714b at intersection 710. The vertical brackets extend above the diagonal beams by about 2 inches and below the diagonal beams by about 4 inches. Vertical bracket 714a comprises hole 722a, centered on vertical axis 724a, and threaded hole 716a, preferably on an exterior surface to retain the solar panel. Bolt 712a is threaded into threaded hole 716a. Similarly, threaded hole 716b and bolt 712b (not shown) are included in vertical bracket 714b. Likewise, vertical bracket 714b includes vertical hole 722b centered on vertical axis 724b. In a preferred embodiment, the vertical brackets are welded to the diagonal beams. In another embodiment, the vertical brackets are bolted to the diagonal beams.

In use, proximal ends 706 and 707 of diagonal beams 702 and 704 are positioned under the storage tank and adjacent bottom surface 128. Intersection 710 is positioned adjacent vertical wall 122 along top surface 134. The vertical brackets extend above and are positioned adjacent to vertical wall 122 and contact interior surface 132. The battery box is secured to distal ends 708 and 709. Poles supporting the solar panel are secured in the one or both of the vertical brackets.

Figure 8:
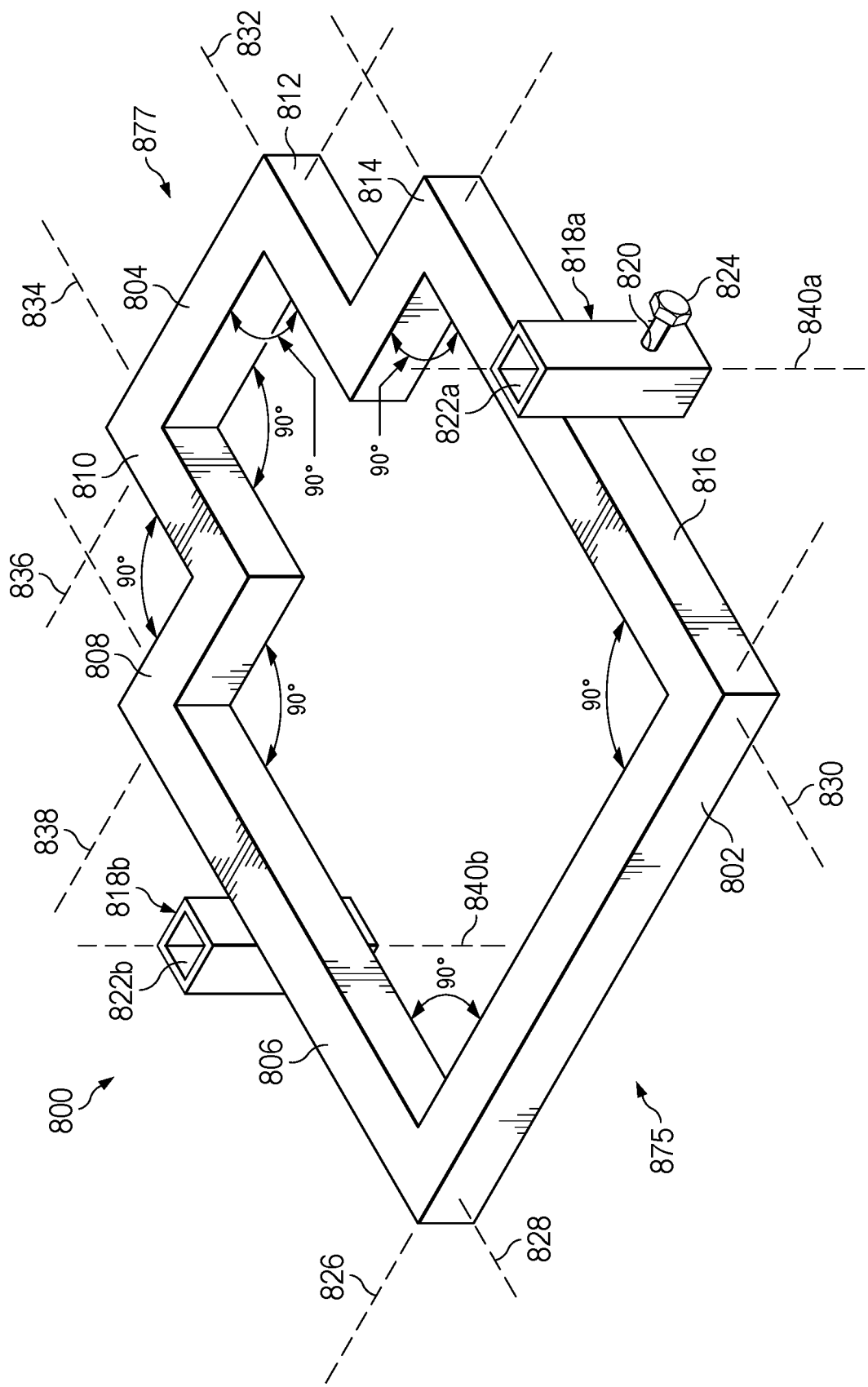
FIG. 8 is an isometric view of a preferred embodiment of a brace.

Referring to FIG. 8, "step-side brace" 800 will be further described. The step-side brace has proximal end 875 and distal end 877.

Step-side brace 800 is comprised of longitudinal beam 806 and longitudinal beam 816, transverse beam 802 and transverse beam 804, corner beam 808, corner beam 810, corner beam 812, corner beam 814, and vertical brackets 818*a* and 818*b*.

Transverse beam 802 is centered on transverse axis 826. Longitudinal beam 806 includes longitudinal axis 828. Corner beams 808 and 814 are centered on transverse axis 838. Corner beam 810 is centered on longitudinal axis 834. Transverse beam 804 is centered on transverse axis 836. Corner beam 812 is centered on longitudinal axis 832. Longitudinal beam 816 is centered on longitudinal axis 830.

Transverse beam 802 is connected to longitudinal beam 806. Longitudinal beam 806 is further connected to corner beam 808. Corner beam 808 is further connected to corner beam 810. Corner beam 810 is further connected to transverse beam 804. Transverse beam 804 is further connected to corner beam 812. Corner beam 812 is further connected to corner beam 814. Corner beam 814 is further connected to longitudinal beam 816. Each beam connection forms a generally 90° angle other angles may suffice. In a preferred embodiment, the beams are welded together. In another preferred embodiment, the brace may employ bolted connections.

Vertical bracket 818*a* is centrally positioned on longitudinal beam 816, about halfway between proximal end 875 and distal end 877. Likewise, vertical bracket 818*b* is centrally positioned on longitudinal beam 806, about halfway between proximal end 875 and distal end 877. The vertical brackets preferably extend above the top surfaces of the longitudinal beams by about 2 inches and below the bottom surfaces of the longitudinal beams by about 4 inches. Vertical bracket 818*a* comprises hole 822*a*, centered on vertical axis 840*a* and threaded hole 820, preferably on an exterior surface. Bolt 824 is threaded into threaded hole 820. Similarly, vertical bracket 818*b* comprises hole 822*b*, centered on vertical axis 840*b*, and a threaded hole (not shown). A bolt (not shown) is threaded into the threaded hole, to retain a solar panel, as will be further described. In a preferred embodiment, the vertical brackets are welded to the longitudinal beams. In another embodiment, the vertical brackets are bolted to the longitudinal beams.

Transverse axis 826, transverse axis 836, and transverse axis 838 are oriented generally perpendicular to longitudinal axis 828, longitudinal axis 830, longitudinal axis 832, and longitudinal axis 834. Transverse axes 826, 836, and 838 are preferably generally parallel to each other. Likewise, longitudinal axes 828, 830, 832, and 834 are preferably generally parallel. Vertical axes 840*a* and 840*b* are generally perpendicular to transverse axes 826, 836, and 838 and longitudinal axes 828, 830, 832, and 834. The longitudinal axes and the transverse axes are preferably coplanar.

In use, transverse beam 802 is positioned under the storage tank adjacent bottom surface 128. Longitudinal beams 806 and 816 are positioned adjacent vertical wall 122 and are balanced on top surface 134. The vertical brackets extend above and are positioned adjacent to vertical wall 122 and contact interior surface 132. The battery is fixed to transverse beam 804. One or more poles are secured in the brackets to support solar panels.

Preferably, the longitudinal beams, the transverse beams, and the corner beam are all formed from 2-inch square steel channel made from A572, A588, or A36. Other lighter materials such as aluminum or steel angle may be employed for weight reduction. Preferably, vertical brackets 818*a* and 818*b* are made of similar square 4-inch steel channel.

Figure 9A:
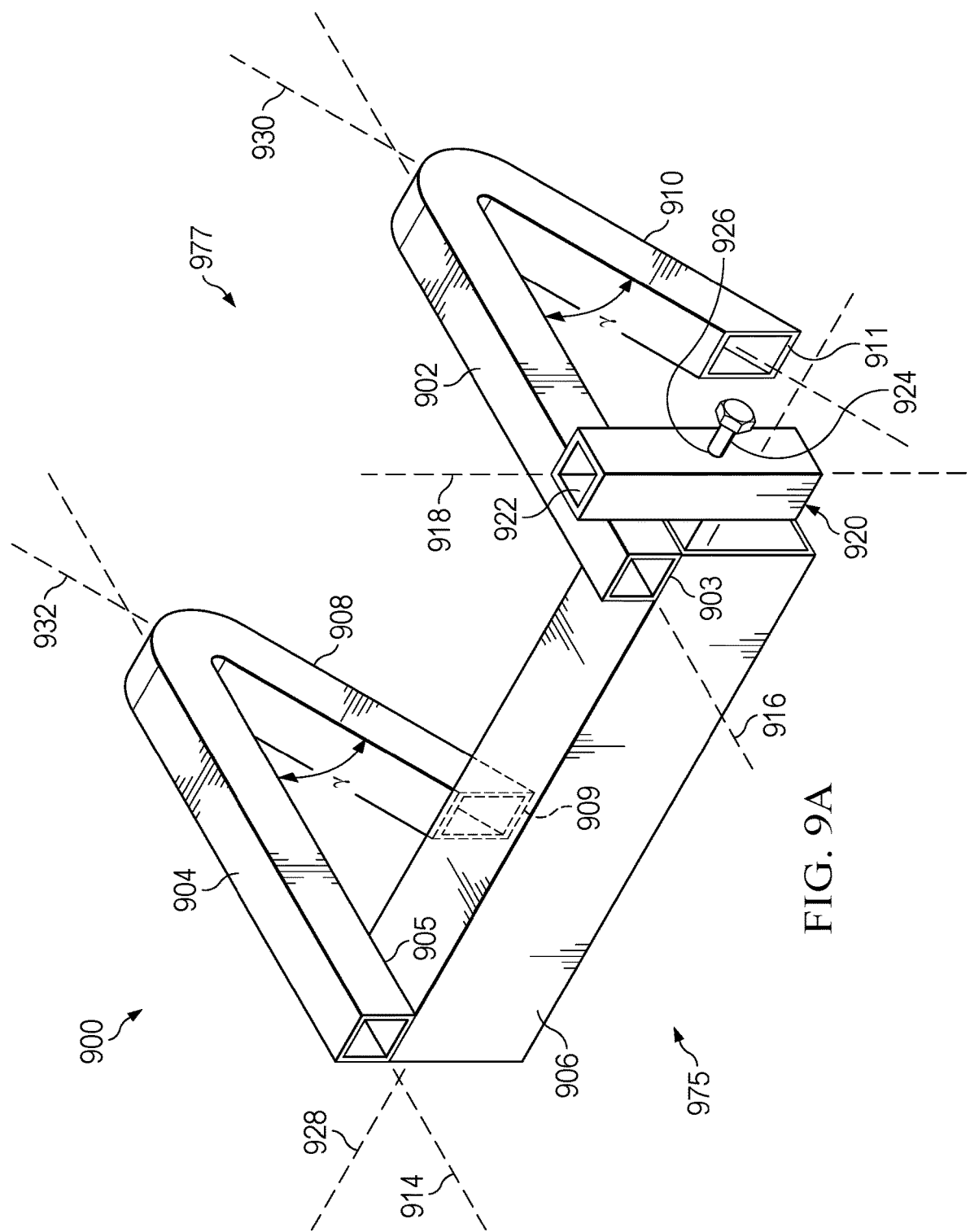
FIG. 9A is an isometric view of a preferred embodiment of a brace.
Figure 9B:
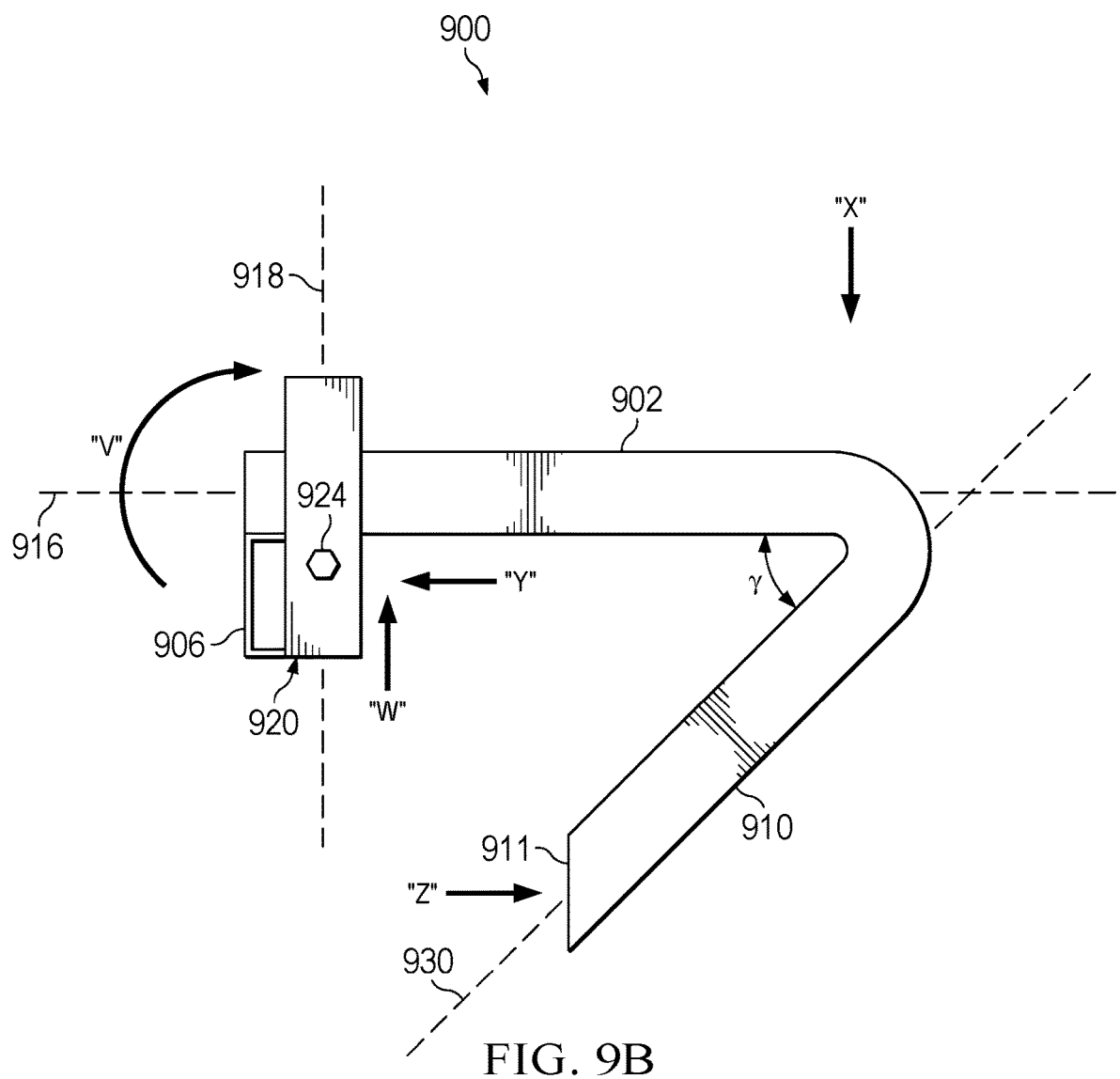
FIG. 9B is an elevation view of a preferred embodiment of a brace.

Referring to FIGS. 9A and 9B, "offset brace" 900 will be further described. The offset brace has proximal end 975 and distal end 977.

Offset brace 900 is comprised of longitudinal beam 902, longitudinal beam 904, transverse beam 906, angle beam 908, angle beam 910 and vertical bracket 920.

Longitudinal beam 904 is centered on longitudinal axis 914. Longitudinal beam 902 is positioned on longitudinal axis 916. Transverse beam is centered on transverse axis 928. Angle beam 908 is centered on diagonal axis 932. Angle beam 910 is centered on diagonal axis 930.

Longitudinal beam 904 is connected to transverse beam 906 at lower surface 905. Longitudinal beam 904 is further connected to angle beam 908. Transverse beam 906 is further connected to longitudinal beam 902 at lower surface 903. Longitudinal beam 902 is further connected to angle beam 910. Angle beams 908 and 910 include contact surfaces 909 and 911, respectively. In a preferred embodiment, the beams are welded together. In another preferred embodiment, the brace may employ bolted connections.

Transverse axis 928 is positioned below and generally perpendicular to longitudinal axes 914 and 916. Longitudinal axes 914 and 916 are preferably generally parallel. Diagonal axis 930 and 932 are preferably oriented at about 45° angles to longitudinal axes 914 and 916, respectively. Angles of between about 20° and about 90° may be employed for the diagonal axes, but should both be about the same. Diagonal axes 930 and 932 are preferably generally parallel. Vertical axis 918 is generally perpendicular to transverse axis 928 and longitudinal axes 914 and 916.

Longitudinal beam 902 is rigidly attached to vertical bracket 920 adjacent transverse beam 906. The vertical bracket preferably extends above the top surface of the longitudinal beam by about 2 inches and is positioned flush with the bottom of the transverse beam. Vertical bracket 920 comprises hole 922 and threaded hole 926, preferably on an exterior surface. Bolt 924 is threaded into threaded hole 926. In a preferred embodiment, vertical bracket 920 is welded to longitudinal beam 902. In another embodiment, vertical bracket 920 is bolted to longitudinal beam 902. In another embodiment, the vertical bracket may be positioned adjacent the transverse beam and longitudinal beam 904.

In use, transverse beam 906 is positioned adjacent vertical wall 122 and contacts interior surface 132 to form an offset latch. Longitudinal beams 902 and 904 about top surface 134. Contact surface 909 is positioned adjacent to and abuts exterior surface 130. Likewise, contact surface 911 is positioned adjacent to and abuts exterior surface 130. Vertical bracket 920 extends above and is positioned adjacent to vertical wall 122 and contacts interior surface 132. The battery box is secured to longitudinal beams 902 and 904 at distal end 977. The pole is secured in the bracket. Importantly, in this embodiment, the moment created by the battery box about the transverse beam is offset by the force exerted by the exterior surface of the basin against contact surfaces 909 and 911.

Figure 10:
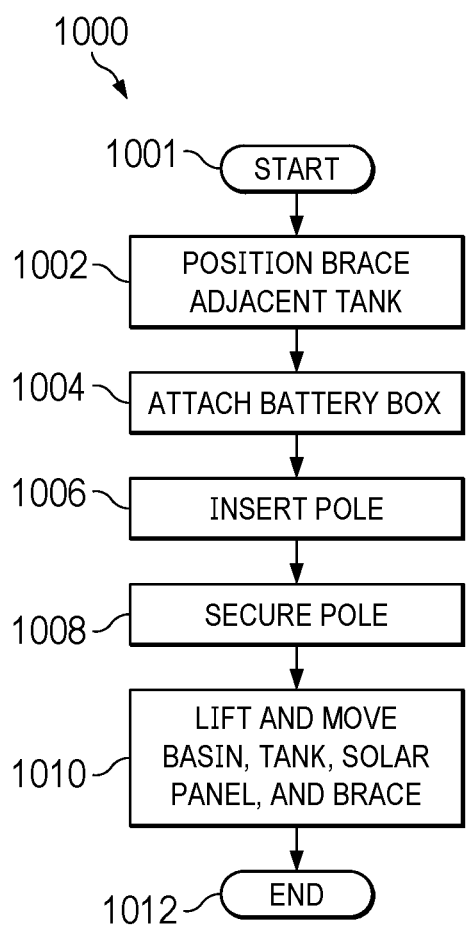
FIG. 10 is a flow chart of a preferred method for mounting a brace to a storage tank.
Figure 11:
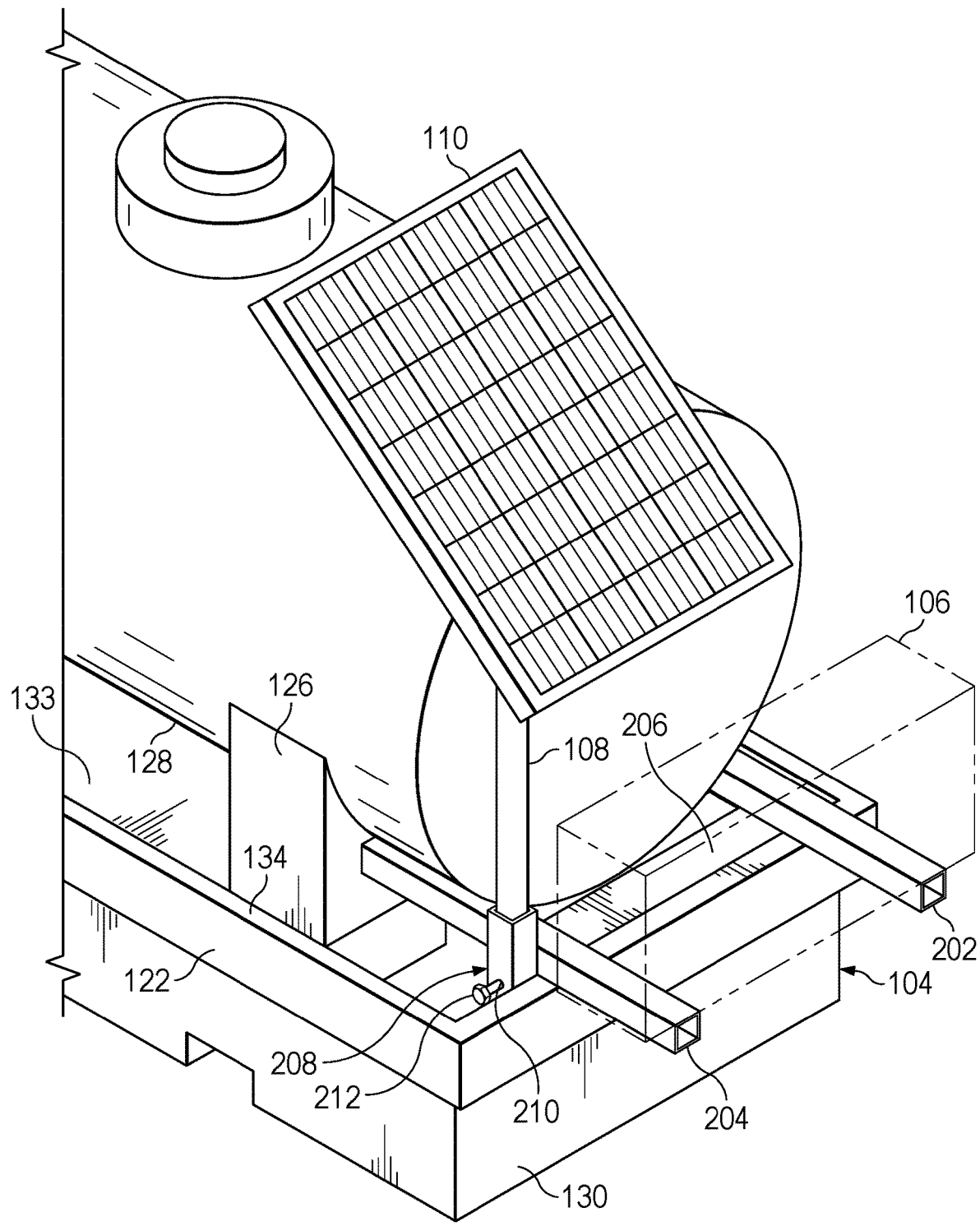
FIG. 11 is an isometric view of a brace mounted to a storage tank.
Figure 12:
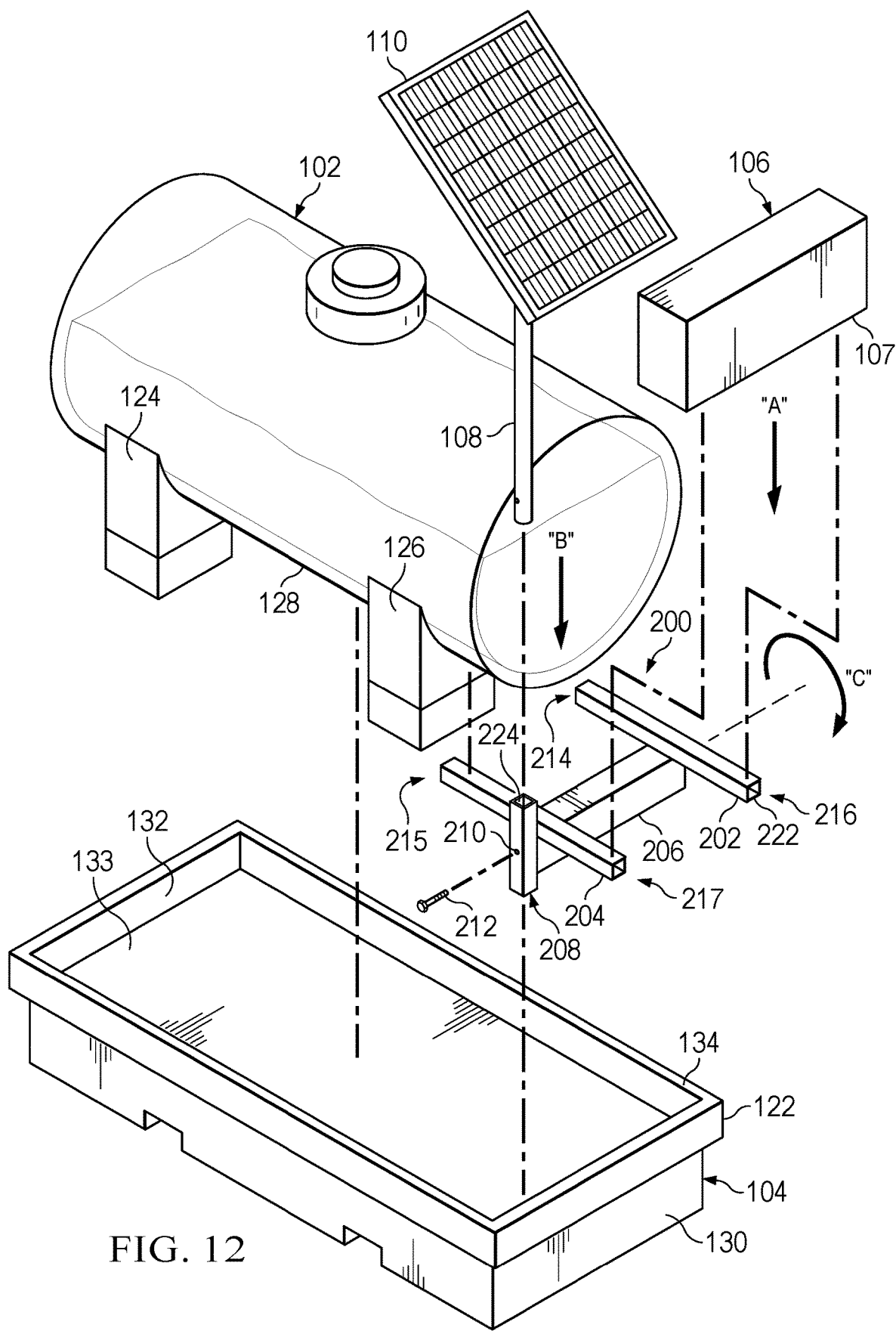
FIG. 12 is an exploded view of a preferred brace and a storage tank combination.

Referring to FIGS. 10, 11, and 12, method 1000 for mounting and using the various embodiments of the brace will be further described. The figures depict the H-brace, but the method applies equally to the H-brace, the box-brace, the U-brace, the apex brace, the V-brace, the X-brace, the step-side brace and the offset brace.

At step 1001, the method begins.

At step 1002, the proximal end of the brace is positioned under the tank beneath bottom surface 128 and adjacent the forward supports. Since the opposing longitudinal beams are located on opposite sides of tank 102, transverse movement of the brace is prevented relative to tank 102. The vertical bracket and the transverse beam are positioned adjacent to and contacting interior surface 132 and prevent the brace from being dislodged in a distal direction away from tank 102. The longitudinal beams are positioned adjacent to and contacting top surface 134. The vertical bracket is positioned adjacent vertical wall 122 to further assists in preventing the brace from moving in a distal direction away from tank 102.

At step 1004, battery box 106 is attached to the brace. Bottom surface 107 of battery box 106 is positioned on the distal end of the brace. In a preferred embodiment, battery box 106 is anchored in place by screws (not shown).

In practice, for the distal end of the brace supports battery box 106 in a cantilevered fashion. The weight of battery box 106 creates a downward force in direction "A" resulting in a moment at the fulcrum of top surface 134 in clockwise direction "C". The moment is resisted by a downward force in direction "B" from tank 102 on the proximal end of the brace, thereby securing the brace to the storage tank.

However, referring also to FIG. 9B, in the case of the offset brace, the weight of the battery box in direction "X" on the longitudinal beams is resisted by the upward force "W" of the top surface of the basin acting on the longitudinal beam. However, force "X" creates moment "V" in a clockwise direction about the fulcrum of top surface 134 of the basin. Moment "V" is offset by force "Y" provided by interior surface 132, acting on vertical bracket 208 and force "Z" created by exterior surface 130 acting on the contact surfaces of the brace in direction "Z".

At step 1006, pole 108 including solar panel 110 is inserted into hole 224 of vertical bracket 208 and adjusted into position by rotating it.

At step 1008, pole 108 is secured within vertical bracket 208 by tightening bolt 212 in threaded hole 210, thereby fixing pole 108 in place by friction.

At step 1010, optionally, the tank, the brace, the battery box and the solar panel are lifted, by the basin, and moved to another location as an integral unit without the need for disassembly or reassembly.

At step 1012, the method concludes.

Figure 13:
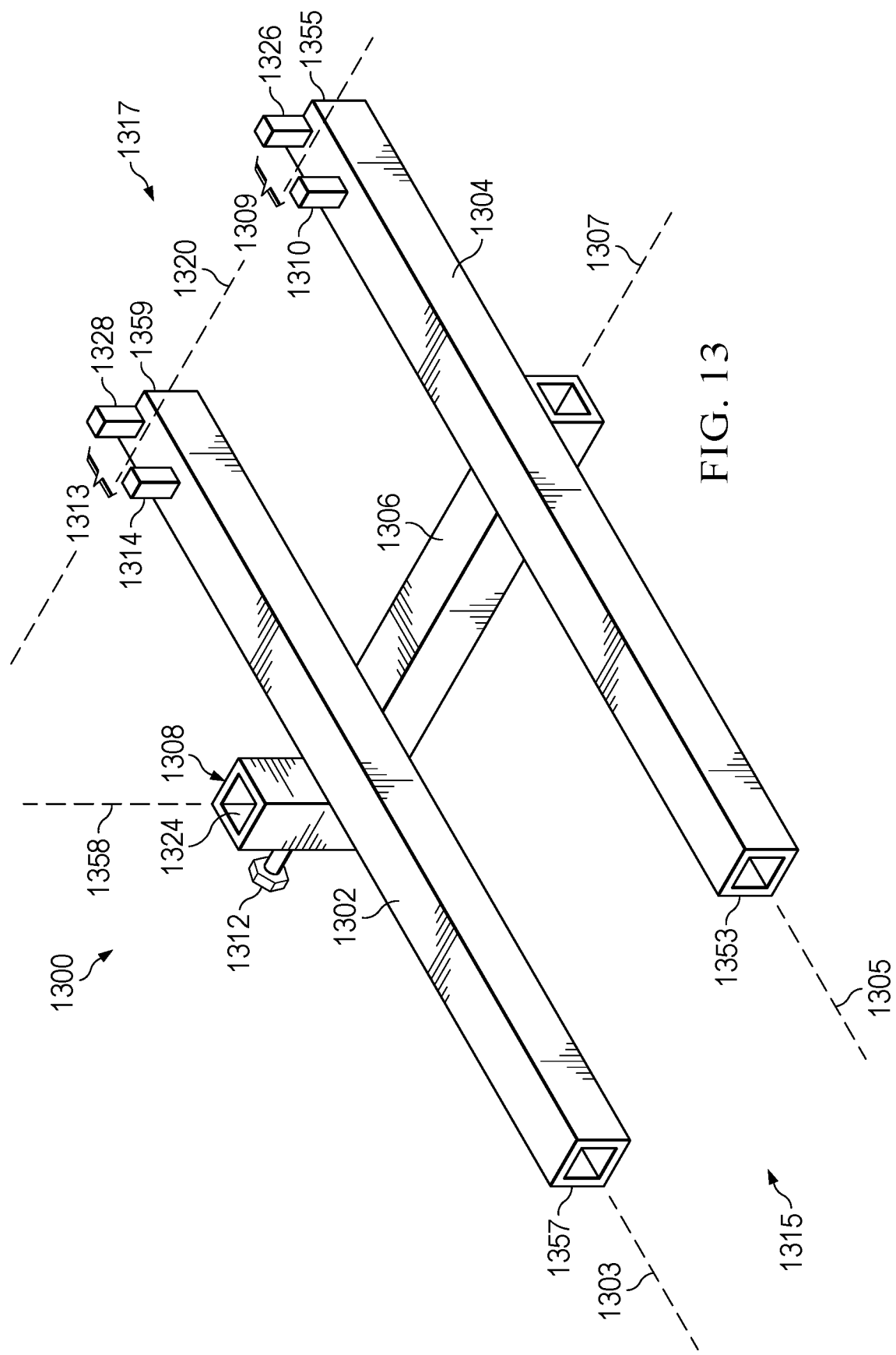
FIG. 13 is an isometric view of a preferred embodiment of a brace.

Referring then to FIG. 13, stanchion riser brace 1300 will be further described.

Stanchion riser brace 1300 is comprised of longitudinal beam 1302, longitudinal beam 1304, and transverse beam 1306, and has distal end 1315, and proximal end 1317.

Longitudinal beam 1302 is comprised of proximal end 1359 and distal end 1357, centered on longitudinal axis 1303. Longitudinal beam 1302 is connected to transverse beam 1306, centered on transverse axis 1307, at its approximate midpoint, by a weldment. Longitudinal beam 1304 includes proximal end 1355 and distal end 1353, centered on longitudinal axis 1305. Longitudinal beam 1304 is connected to transverse beam 1306, at its approximate midpoint, by a weldment. In another preferred embodiment, the brace may employ bolted connections.

Longitudinal beam 1302 is rigidly attached to vertical bracket 1308. The vertical bracket is positioned about midway between proximal end 1317 and distal end 1315, and preferably extends about two inches above the top surface of the longitudinal beams and is flush with the bottom surface of the transverse beam. In another embodiment, the vertical bracket may be mounted to longitudinal beam 1304, adjacent to the transverse beam. Vertical bracket 1308 comprises of hole 1324, and a threaded hole (not shown), preferably on an exterior surface. Bolt 1312 is threaded into the threaded hole. In a preferred embodiment, vertical bracket 1308 is welded to longitudinal beam 1302 by a weldment in a vertical orientation, having vertical axis 1358. In another embodiment, the vertical bracket is bolted to the longitudinal beam.

Positioning the stanchion 1326 is rigidly affixed to the top surface of longitudinal beam 1304 at proximal end 1355. Positioning stanchion 1310 is rigidly fixed to longitudinal beam 1304, adjacent and distal to positioning stanchion 1326, leaving gap 1309, to be further described.

Positioning stanchion 1328 is rigidly fixed to the top surface of longitudinal beam 1302 at proximal end 1359. Likewise, positioning stanchion 1314 is positioned rigidly fixed to the top surface of longitudinal beam 1302, distal and adjacent to positioning stanchion 1328, leaving gap 1313. Each of gaps 1309 and 1313 are centered on stanchion axis 1320.

Transverse axis 1307 is generally perpendicular to longitudinal axis 1305 and longitudinal axis 1303. Longitudinal axes 1305 and 1303 are generally coplanar and generally parallel. Stanchion axis 1320 is generally parallel with transverse axis 1307 and generally perpendicular to each of the longitudinal axes 1303 and 1305. Vertical axis 1358 is preferably about perpendicular to the longitudinal axes and the transverse axis.

In use, gap 1313 and gap 1309 accommodate a transverse beam of a riser bracket, as will be further described. Transverse beam 1306 is positioned adjacent bottom surface 133 of basin 104. Both longitudinal beams are positioned resting on top surface 134. Battery box 106 is secured to distal end 1357 of longitudinal beam 1302 and distal end 1353 of longitudinal beam 1304. The pole is secured in hole 1324.

Figure 14:
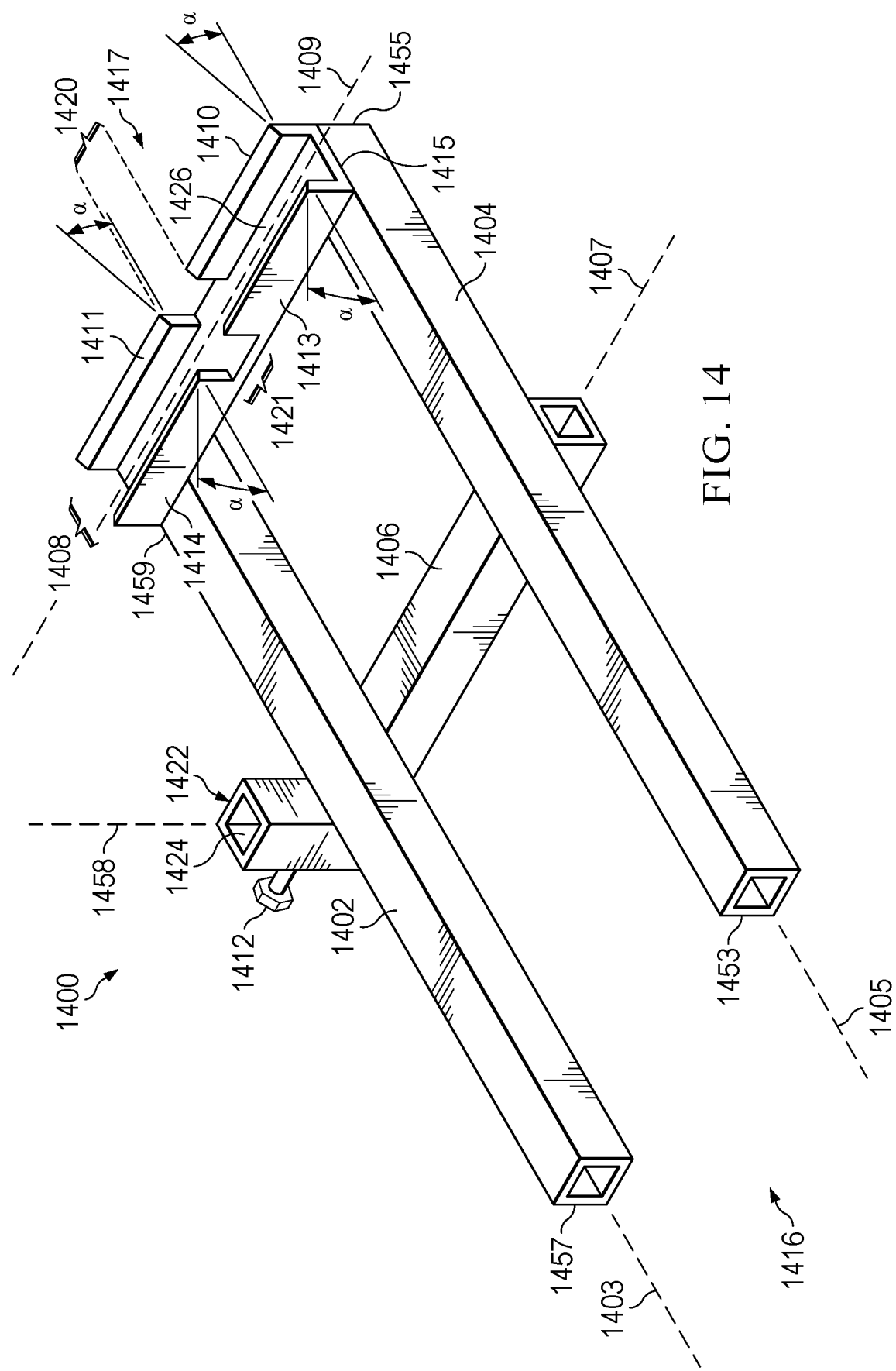
FIG. 14 is an isometric view of a preferred embodiment of a brace.

Referring to FIG. 14, channel riser brace 1400 will be further described.

Channel riser brace 1400 is comprised of longitudinal beam 1402, longitudinal beam 1404, transverse beam 1406, and positioning channel 1408, and has distal end 1416 and proximal end 1417.

Longitudinal beam 1402 comprises proximal end 1455, and distal end 1457 centered on longitudinal axis 1403. Longitudinal beam 1402 is connected to transverse beam 1406, centered on transverse axis 1407, at its approximate midpoint, by a weldment. Longitudinal beam 1404 includes proximal end 1455 and distal end 1453, centered longitudinal axis 1405. Longitudinal beam 1404 is connected to transverse beam 1406, at its approximate midpoint, by a weldment. In another preferred embodiment, the brace may employ bolted connections.

Longitudinal beam 1402 is rigidly attached to vertical bracket 1422. The vertical bracket is positioned about midway between proximal end 1417 and distal end 1416, and preferably extends about two inches above the top surface of the longitudinal beams and is flush with the bottom surface of the transverse beam. In another embodiment, the vertical bracket may be mounted to longitudinal beam 1404, adjacent to the transverse beam. Vertical bracket 1422 comprises of hole 1424, and a threaded hole (not shown), preferably on an exterior surface. Bolt 1412 is threaded into the threaded hole. In a preferred embodiment, vertical bracket 1422 is welded to longitudinal beam 1402 by a weldment in a vertical orientation, having vertical axis 1458. In another embodiment, the vertical bracket is bolted to the longitudinal beam.

Longitudinal beam 1404 is rigidly attached to positioning channel 1415 at proximal end 1455. Likewise, longitudinal beam 1404 is rigidly attached to positioning channel 1408 at proximal end 1459. Positioning channel 1415 is comprised of vertical walls 1410, 1411, 1413, and 1414, each rigidly connected to channel base 1426. Each of the vertical walls is inwardly beveled at an angle δ. Preferably δ is about 45°. Notch 1420 is positioned centrally between walls 1410 and 1411. Notch 1421 is positioned centrally between walls 1413 and 1414. Each of the notches terminates flush with channel base 1426. Vertical walls 1410, 1411, 1413, and 1414 form positioning channel 1408, which is colinearly positioned along central channel axis 1409.

Transverse axis 1407 and channel axis 1409 are generally perpendicular to longitudinal axis 1405 and longitudinal axis 1403. The transverse axis and the channel axis are generally parallel. Likewise, the longitudinal axes are generally parallel and generally coplanar. Vertical axis 1458 is preferably about perpendicular to the longitudinal axes and the transverse axis.

In the preferred embodiment, the longitudinal beams are each about four feet long and are formed of 2 inch squared channel stock. Preferably, the transverse beam is approximately sixteen inches long and is formed from four-inch channel stock. The longitudinal beams, transverse beams, and positioning channel are preferably formed of steel channel, and preferably A572, A588 or a A36 steel angle stock may also be employed in place of the channel. Preferably each of notches 1420 and 1421 is about 6 inches in width, centrally positioned in the positioning channel.

In use, the beveled surfaces are used to position a transverse beam of a riser bracket in positioning channel 1408, as will be further described. The bevels allow for quicker and less precise positions of the bracket with respect to the brace which is important because many times it is difficult or impossible to see the brace under the tank connected in the basin. At the same time, a longitudinal beam of a riser bracket is positioned centrally within notches 1420 and 1421, as will be further described, thereby constraining the motion of the channel riser brace with respect to the riser bracket both laterally and longitudinally. The longitudinal beams are positioned on top surface 134. Transverse beam 1406 is positioned in basin 104 in contact with bottom surface 133. The battery box is secured at distal end 1453 of longitudinal beam 1404 and distal end 1457 of longitudinal beam 1402. The pole is secured in hole 1424.

Figure 15:
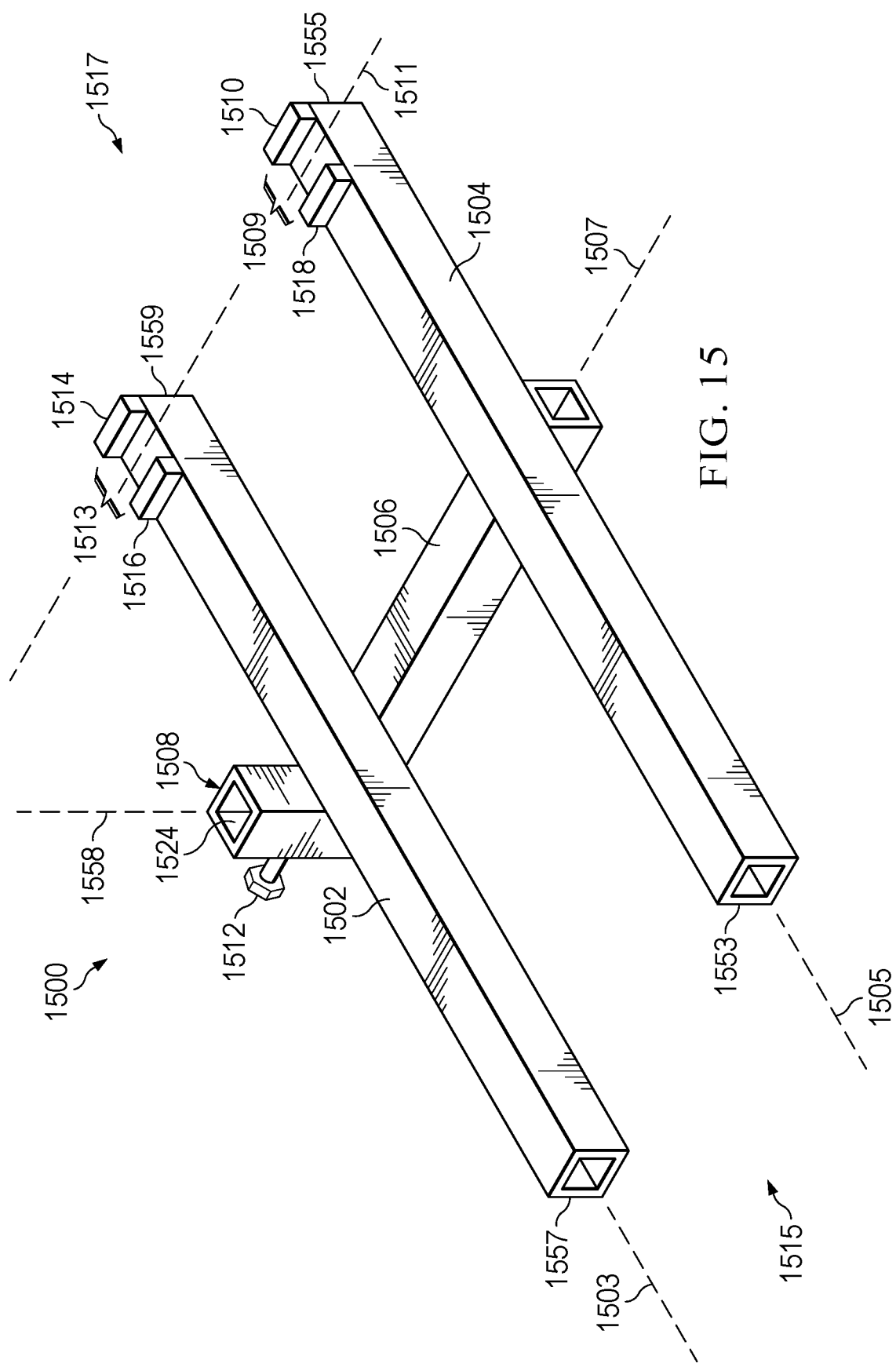
FIG. 15 is an isometric view of a preferred embodiment of a brace.

Referring to FIG. 15, bar riser brace 1500 will be further described.

Bar riser brace 1500 is comprised of longitudinal beam 1502, longitudinal beam 1504, and transverse beam 1506, and has distal end 1515 and proximal end 1517.

Longitudinal beam 1502 comprises proximal end 1559 and distal end 1557, centered on longitudinal axis 1503. Longitudinal beam 1502 is connected to transverse beam 1506, centered on a transverse axis 1507, at its approximate midpoint, by a weldment. Longitudinal beam 1504 includes proximal end 1555 and distal end 1553 centered on longitudinal axis 1505. Longitudinal beam 1504 is connected to transverse beam 1506, at its approximate midpoint, by a weldment. In other preferred embodiments, the brace may employ bolted connections.

Longitudinal beam 1502 is rigidly attached to vertical bracket 1508. The vertical bracket is positioned about midway between proximal end 1517 and distal end 1515, and preferably extends about two inches above the top surface of the longitudinal beams and is flush with the bottom surface of the transverse beam. In another embodiment, the vertical bracket may be mounted to longitudinal beam 1504, adjacent to the transverse beam. Vertical bracket 1508 comprises of hole 1524, and a threaded hole (not shown), preferably on an exterior surface. Bolt 1512 is threaded into the threaded hole. In a preferred embodiment, vertical bracket 1508 is welded to longitudinal beam 1502 by a weldment in a vertical orientation, having vertical axis 1558. In another embodiment, the vertical bracket is bolted to the longitudinal beam.

Positioning bar 1510 is rigidly attached to longitudinal beam 1504, at proximal end 1555. Likewise, positioning bar 1518 is positioned adjacent and distal to positioning bar 1510, rigidly fixed on longitudinal beam 1504, leaving gap 1509.

Positioning bar 1514 is rigidly fixed to longitudinal beam 1502 at proximal end 1559. Positioning bar 1516 is positioned adjacent and distal to positioning bar 1510 and rigidly fixed on longitudinal beam 1502, leaving gap 1513. Gap 1513 and gap 1509 are both equal width and are centered on positioning axis 1511.

Transverse axis 1507 is generally perpendicular to longitudinal axis 1505 and longitudinal axis 1503. Longitudinal axis 1505 and longitudinal axis 1503 are coplanar and generally parallel. Positioning axis 1511 is generally parallel to transverse axis 1507 and generally perpendicular to both longitudinal axis 1503 and longitudinal axis 1505. Vertical axis 1558 is preferably about perpendicular to the longitudinal axes and the transverse axis.

In a preferred embodiment, the longitudinal beams are each about 4 feet long and formed from 2 inch channel stock. Likewise, the transverse beam is approximately 16 inches long and formed from 2 inch channel stock. The positioning bars are preferably one inch square cold rolled steel. The longitudinal beams and the transverse beam are preferably formed of A572, A588 or a A36 channel. Alternatively, the longitudinal beams and transverse beams can be formed of steel angle stock.

In use, positioning bar 1510, positioning bar 1518, positioning bar 1514 and positioning bar 1516 are placed adjacent a transverse beam of a riser bracket, which is centrally accommodated by gap 1509 and gap 1513, thereby constraining lateral and longitudinal motion of the bar riser brace with respect to the riser bracket, as will be further described. Transverse beam 1506 is positioned against bottom surface 133 of basin 104. Longitudinal beam 1504 and longitudinal beam 1502 are placed in contact with top surface 134 of basin 104. The battery box is secured to distal end 1553 and 1557, and the pole is secured in hole 1524, as will be further described.

Figure 16:
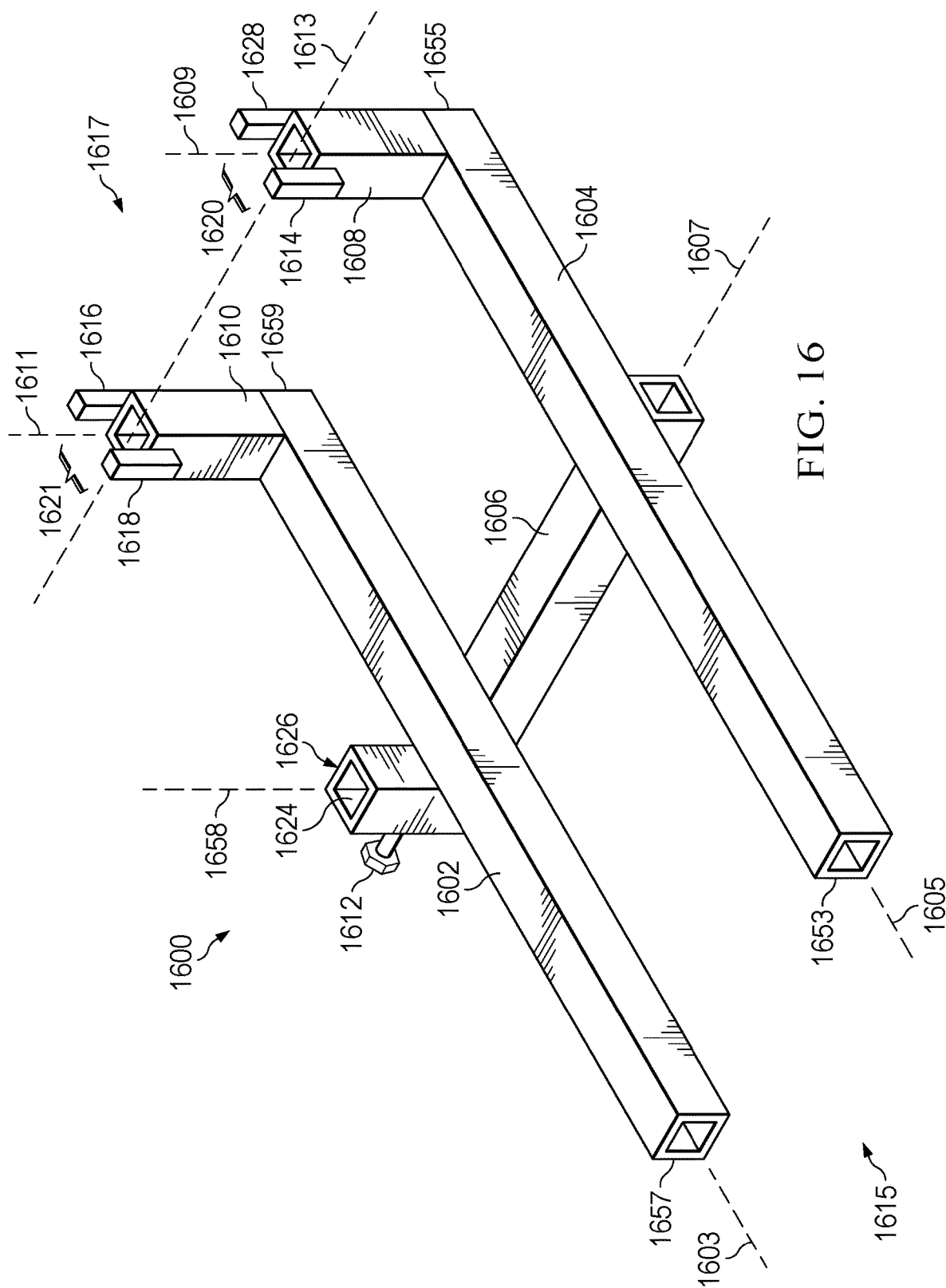
FIG. 16 is an isometric view of a preferred embodiment of a brace.

Referring to FIG. 16, extension riser brace 1600 will be further described.

Extension riser brace 1600 is comprised of longitudinal beam 1602, longitudinal beam 1604, and transverse beam 1606, and has distal end 1615 and proximal end 1617.

Longitudinal beam 1602 comprises proximal end 1659 and distal end 1657, centered on longitudinal axis 1603. Longitudinal beam 1602 is connected to transverse beam 1606, centered on transverse axis 1607, at its approximate midpoint, by a weldment. Longitudinal beam 1604 includes proximal end 1655 and distal end 1653, centered on longitudinal axis 1605. Longitudinal beam 1604 is connected to transverse beam 1606, at its approximate midpoint, by a weldment.

Longitudinal beam 1602 is rigidly attached to vertical bracket 1626. The vertical bracket is positioned about midway between proximal end 1617 and distal end 1615, and preferably extends about two inches above the top surface of the longitudinal beams and is flush with the bottom surface of the transverse beam. In another embodiment, the vertical bracket may be mounted to longitudinal beam 1604, adjacent to the transverse beam. Vertical bracket 1626 comprises of hole 1624, and a threaded hole (not shown), preferably on an exterior surface. Bolt 1612 is threaded into the threaded hole. In a preferred embodiment, vertical bracket 1626 is welded to longitudinal beam 1602 by a weldment in a vertical orientation, having vertical axis 1658. In another embodiment, the vertical bracket is bolted to the longitudinal beam.

Extension 1608, centered on vertical axis 1609, is rigidly fixed to proximal end 1655 of longitudinal beam 1604. Positioning stanchion 1628 and positioning stanchion 1614 are rigidly fixed to extension 1608, leaving gap 1620 transversely centered on positioning axis 1613.

Extension 1610, centered on vertical axis 1611, is rigidly fixed to longitudinal beam 1602. Positioning stanchion 1616 and positioning stanchion 1618 are rigidly fixed to extension 1610, leaving gap 1621 transversely centered on positioning axis 1613.

Transverse axis 1607 and positioning axis 1613 are oriented generally perpendicular to longitudinal axis 1605 and longitudinal axis 1603. Longitudinal axis 1603 and longitudinal axis 1605 are preferably coplanar and generally parallel. Vertical axis 1609 and vertical axis 1611 are preferably mutually perpendicular to positioning axis 1613, and positioning axis 1607, longitudinal axis 1603 and longitudinal axis 1605. Vertical axis 1658 is preferably about perpendicular to the longitudinal axes and the transverse axis.

In a preferred embodiment, the longitudinal beams, transverse beam, and extensions are formed of 4 inch square channel stock. Preferably, the longitudinal beams are about 6 feet long. Preferably, the transverse beam is about 4 feet long. Likewise, the extensions are formed from 4 inch channel stock. Each of the positioning stanchions is preferably one inch square, cold rolled steel. In referred embodiment the longitudinal beams, transverse beam, extensions and positioning stanchions are formed A572, A588 or a A36 steel. Alternatively, the longitudinal beam and transverse beam can be formed of steel angle stock.

In use, the extensions are positioned underneath and adjacent to a transverse beam of a riser bracket, as will be further described. The transverse beam is accommodated by gap 1621 and gap 1620. Transverse beam 1606 is positioned adjacent bottom surface 133. Both longitudinal beam 1602 and longitudinal beam 1604 are positioned against top surface 134. The battery box is secured to distal ends 1553 and 1557. The pole is secured in hole 1524. Importantly, the extensions accommodate larger tanks.

Figure 17:
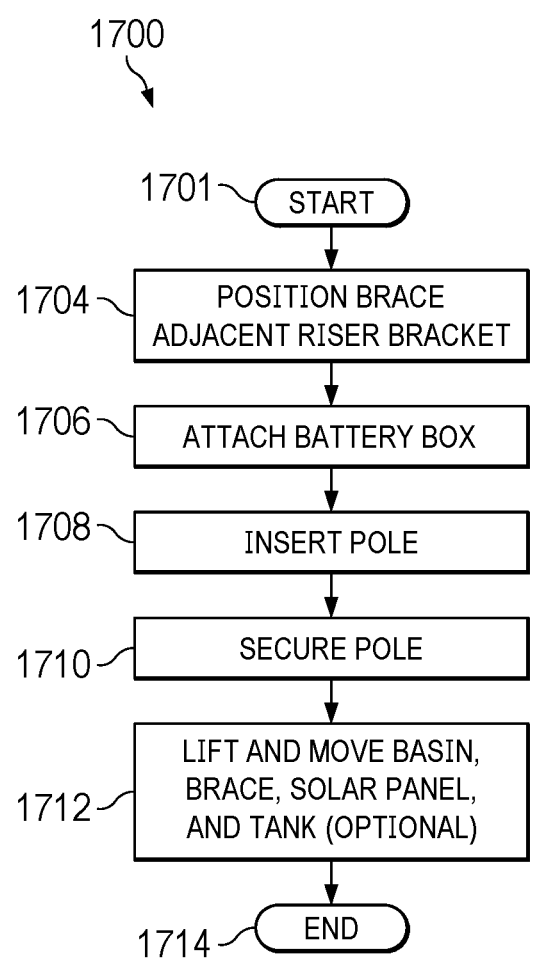
FIG. 17 is a flow chart of a preferred method for mounting a bracket and a brace to a storage tank.
Figure 18:
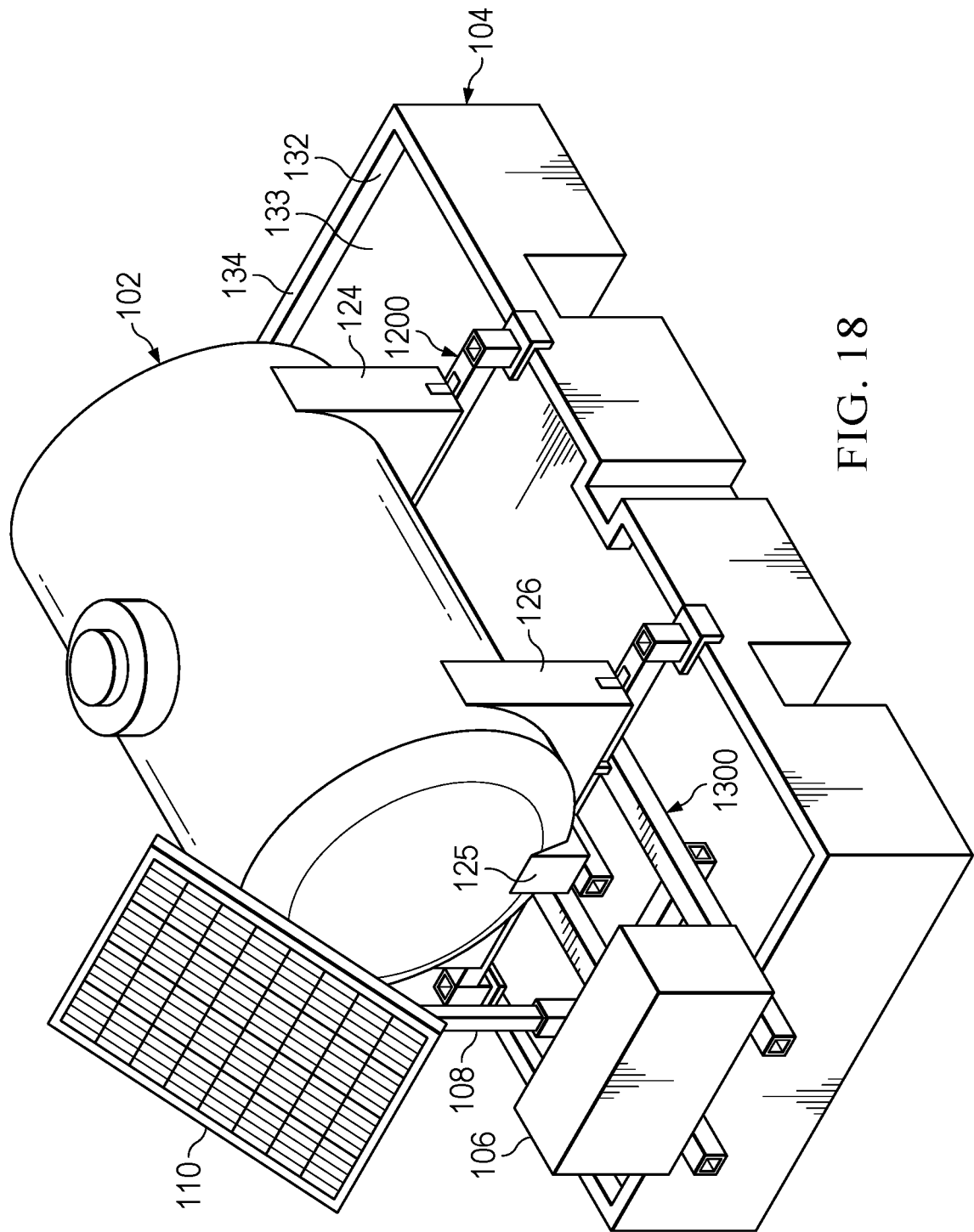
FIG. 18 is an isometric view of a bracket and a brace mounted to a storage tank.
Figure 19:
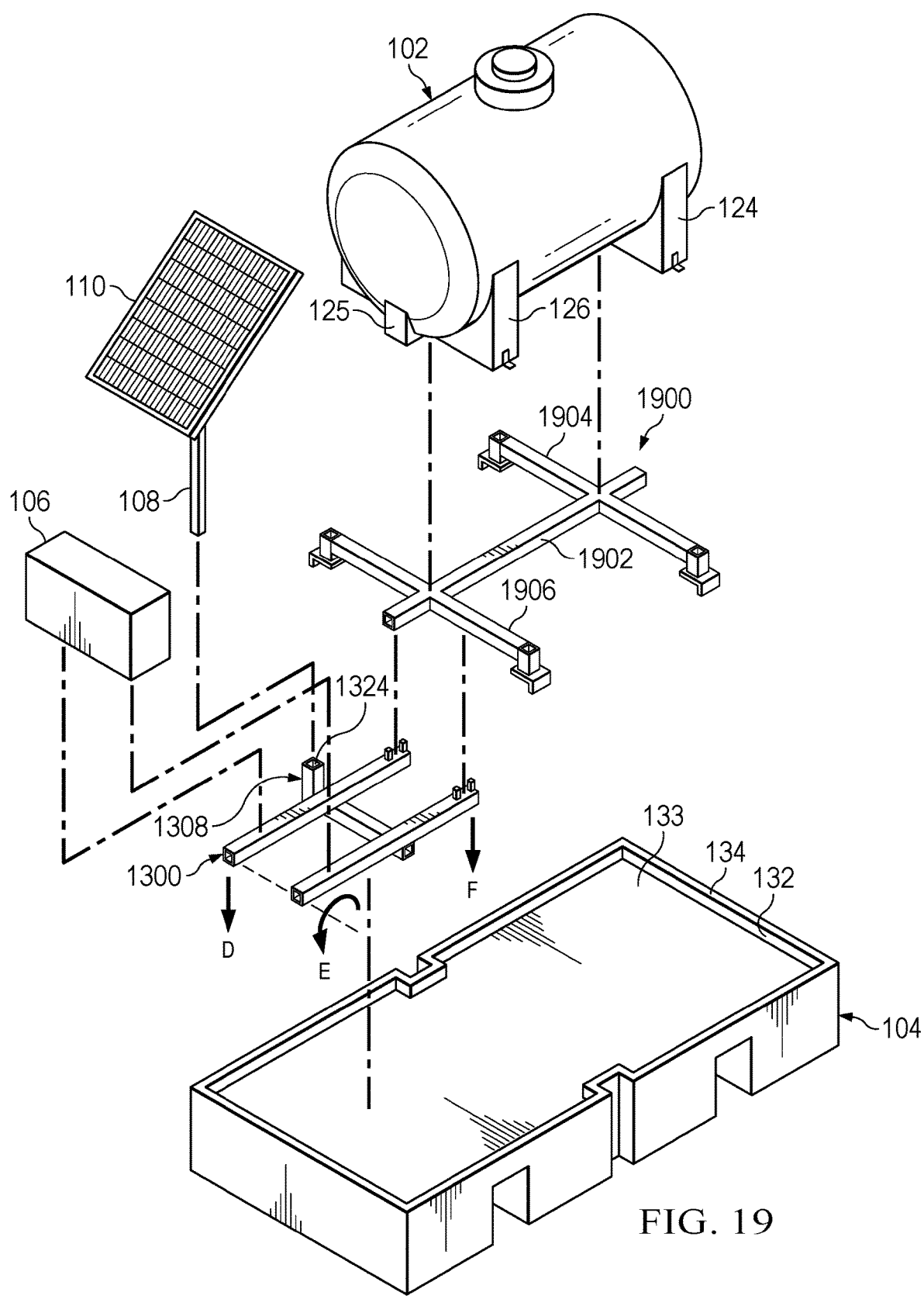
FIG. 19 is an exploded view of a brace and a bracket mounted to a storage tank.

Referring then to FIGS. 17, 18 and 19, method 1700 for mounting and using various embodiments of the riser braces will be further described. FIGS. 18 and 19 depict the stanchion riser brace, but the method applies equally to stanchion riser brace, the channel riser brace, the bar riser brace, and the extension riser brace.

At step 1701, the method begins.

At step 1704, the riser brace is positioned under riser bracket 1900. Riser bracket 1900 is comprised of longitudinal beam 1902, transverse beam 1904, and transverse beam 1906. The transverse beams are positioned under the front and rear supports of the tank and fixed in place by bolts. The longitudinal beam is positioned under longitudinal support 125. In the case of stanchion riser brace 1300, gap 1309 and gap 1313 are positioned adjacent transverse beam 1904 along stanchion axis 1320. In the case of channel riser brace 1400, positioning channel 1408 is positioned adjacent transverse beam 1904, along channel axis 1409, where notch 1420 and notch 1421 accommodate longitudinal beam 1902. In the case of bar riser brace 1500, gap 1509 and gap 1513 are positioned adjacent transverse beam 1904 along positioning axis 1511. In the case of extension riser brace 1600, gap 1620 and gap 1621 are positioned adjacent transverse beam 1904 along positioning axis 1613.

At step 1706, battery box 106 is attached to the brace. The bottom surface of battery box 106 is positioned on the distal end of each longitudinal channel. In a preferred embodiment, the battery box is anchored in place by screws (not shown).

In practice, each of the riser braces supports the battery box at its distal end in a cantilevered arrangement. The weight of the battery box creates a downward force, in direction "D", resulting in a moment at the fulcrum top surface 134 in a counterclockwise direction "E". The moment is resisted by a downward force, in direction "F", from riser bracket 1200, on the proximal end of the brace, thereby preventing movement between the brace and the storage tank assembly. In the case of stanchion riser brace 1300, the positioning stanchions prevent relative motion between the battery box and the brace in a longitudinal direction. Likewise, in the case of channel riser brace 1400, the vertical walls of the positioning channel prevent motion of the brace and the battery box, with respect to the tank, in a longitudinal direction, while the notches prevent motion in a lateral direction. In the same way, with respect to bar riser brace 1500, the positioning bars prevent longitudinal motion of the battery box and the brace with respect to the tank. Finally, with respect to extension riser brace 1600, the positioning stanchions prevent longitudinal motion of the battery box and the brace with respect to the tank.

At step 1708, the pole is inserted in the vertical bracket.

At step 1710, the pole is secured in the vertical bracket.

At step 1712, optionally, the basin, brace, solar panel, and tank can all be moved together as an integral unit by a forklift, if so desired.

At step 1714, the method concludes.

The invention claimed is:

1. A support brace system for supporting a battery container and solar panel assembly by using a tank having a bottom, in a basin having an exterior surface and a vertical wall, the vertical wall having an interior surface and a top surface, the support brace system comprising:
   a first longitudinal beam, having a first proximal end and a first distal end, adjacent the top surface;
   a second longitudinal beam, having a second proximal end and a second distal end, adjacent the top surface;
   the first proximal end and the second proximal end adjacent the bottom;
   a bracket, attached to one of the first longitudinal beam, and the second longitudinal beam, adjacent to the vertical wall;
   the first distal end and the second distal end supporting the battery container; and
   the bracket supporting the solar panel assembly;
   wherein the first longitudinal beam and the second longitudinal beam form a cantilevered support for the battery container.

2. The support brace system of claim 1, wherein:
the first longitudinal beam comprises a first longitudinal axis;
the second longitudinal beam comprises a second longitudinal axis; and
the first longitudinal axis is generally parallel to the second longitudinal axis.

3. The support brace system of claim 1, wherein the first longitudinal beam and the second longitudinal beam are centrally fixed together at an oblique angle.

4. The support brace system of claim 3, wherein:
the bracket extends above and below one of the first longitudinal beam and the second longitudinal beam.

5. The support brace system of claim 2, further comprising:
a centrally positioned transverse beam, having a transverse axis, fixed to the first longitudinal beam and the second longitudinal beam; and
wherein the transverse axis is generally perpendicular to the first longitudinal axis and the second longitudinal axis;
wherein the centrally positioned transverse beam is positioned adjacent the interior surface of the vertical wall.

6. The support brace system of claim 1, further comprising:
wherein the first proximal end and the second proximal end, impinge on the bottom of the tank.

7. The support brace system of claim 2, further comprising:
a proximally positioned transverse beam, connected to the first longitudinal beam and the second longitudinal beam; and
a distally positioned transverse beam, fixed to the first longitudinal beam and the second longitudinal beam.

8. The support brace system of claim 2, further comprising:
a distally positioned transverse beam, connected to the first longitudinal beam and the second longitudinal beam.

9. The support brace system of claim 2, further comprising:
a distally positioned transverse beam, fixed to the first longitudinal beam and the second longitudinal beam;
a first diagonal beam, having a first diagonal axis;
a second diagonal beam, having a second diagonal axis;
the first diagonal beam connected to the first proximal end of the first longitudinal beam;
wherein the first longitudinal axis and the first diagonal axis form a first generally 150° angle and a first generally 30° down angle;
the first diagonal beam, further connected to the second diagonal beam;
wherein the first diagonal axis and the second diagonal axis form a generally 60° angle; and
the second diagonal beam, further connected to the second proximal end of the second longitudinal beam;
wherein the second longitudinal axis and the second diagonal axis form a second generally 150° angle and a second generally 30° down angle.

10. The support brace system of claim 2, further comprising:
a first diagonal beam, having a first diagonal axis and a first down angle axis;
the first diagonal beam, connected to the first proximal end of the first longitudinal beam;
wherein the first longitudinal axis and the first diagonal axis form a first generally 135° angle;
wherein the first longitudinal axis and the first down angle axis form a first generally 30° angle;
the first diagonal beam, further connected to a distally positioned transverse beam, having a transverse axis;
the first diagonal axis and the transverse axis form a first generally 120° angle;
a second diagonal beam, having a second diagonal axis and a second down angle axis;
the distally positioned transverse beam, further connected to the second diagonal beam;
wherein the second diagonal axis and the transverse axis form a second generally 120° angle;
the second diagonal beam connected to the second distal end of the second longitudinal beam;
wherein the second diagonal axis and the second longitudinal axis form a second generally 135° angle; and
wherein the second diagonal axis and the transverse axis forms the second generally 120° angle; and,
wherein the second longitudinal axis and the second down angle axis form a second generally 30° angle.

11. The support brace system of claim 2, further comprising:
a proximally positioned transverse beam, fixed to the first longitudinal beam and the second longitudinal beam;
a first corner beam connected to the first longitudinal beam at about a first right angle;
a second corner beam connected to the first corner beam at about a second right angle;
a distally positioned transverse beam fixed to the second corner beam at about a third right angle;
a third corner beam fixed to the distally positioned transverse beam at about a fourth right angle;
a fourth corner beam fixed to the third corner beam at about a fifth right angle; and
the second longitudinal beam fixed to the fourth corner beam at about a sixth right angle.

12. The support brace system of claim 2, further comprising:
a first angle beam, having a first diagonal axis;
the first angle beam, connected to the first distal end of the first longitudinal beam;
wherein the first diagonal axis and the first longitudinal axis form a first generally 45° angle;
a second angle beam, having a second diagonal axis; and
the second angle beam connected to the second distal end of the second longitudinal beam;
wherein the second diagonal axis and the second longitudinal axis form the first generally 45° angle.

13. The support brace system of claim 12, wherein the first angle beam and second further comprise:
a first contact surface and a second contact surface;
wherein the first contact surface and the second contact surface are positioned adjacent to and contacting the exterior surface of the basin.

14. The support brace system of claim 1, further comprising:
the bracket further comprises a hole insert for receiving a pole; and,
wherein the pole is removably attached within the hole insert.

* * * * *